(12) United States Patent
Ross et al.

(10) Patent No.: US 9,706,516 B2
(45) Date of Patent: *Jul. 11, 2017

(54) SYSTEMS AND METHODS FOR TRANSMITTING INFORMATION, ALERTS, AND/OR COMMENTS TO PARTICIPANTS BASED ON LOCATION INFORMATION

(71) Applicant: JINGLE TECHNOLOGIES LLC, Westport, CT (US)

(72) Inventors: David Ross, Westport, CT (US); Charles Taylor, Fairfield, CT (US)

(73) Assignee: JINGLE TECHNOLOGIES LLC, Westport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,727

(22) Filed: Aug. 3, 2016

(65) Prior Publication Data
US 2016/0345288 A1    Nov. 24, 2016

Related U.S. Application Data

(63) Continuation of application No. 15/045,016, filed on Feb. 16, 2016, now Pat. No. 9,420,560, which is a
(Continued)

(51) Int. Cl.
*H04W 64/00* (2009.01)
*H04W 4/02* (2009.01)
(Continued)

(52) U.S. Cl.
CPC ............. *H04W 64/00* (2013.01); *H04L 51/32* (2013.01); *H04L 65/40* (2013.01); *H04L 67/02* (2013.01);
(Continued)

(58) Field of Classification Search
CPC ................................ H04L 51/32; H04L 67/18
See application file for complete search history.

(56) References Cited

U.S. PATENT DOCUMENTS 4,804,937 A    2/1989 Barbiaux et al.
4,982,346 A    1/1991 Girouard et al.
(Continued)

FOREIGN PATENT DOCUMENTS

JP    2002094700    3/2002
WO    02076077 A1    9/2002
(Continued)

OTHER PUBLICATIONS

International Search Report of the International Searching Authority relating to International Application No. PCT/US12/33611, mailed Jul. 11, 2012.
(Continued)

*Primary Examiner* — Lashonda Jacobs
(74) *Attorney, Agent, or Firm* — Amster, Rothstein & Ebenstein LLP

(57) ABSTRACT

The present invention generally relates to systems and methods for sharing information related to a location also referred to herein as a "spot," such as spot alerts and/or spot comments (e.g., shared information, advertisements, etc.) received, displayed, played, and/or actuated, for example, on recipient mobile electronic devices proximately located to such location (e.g., spot). Users of the system can create spot alerts in which designated recipients can receive messages, such as spot alerts and/or spot comments (e.g., shared information, advertisements, etc.) received, displayed, played, and/or actuated, for example, on respective recipient mobile electronic devices, when located within a proximity of a defined location (e.g., spot).

30 Claims, 25 Drawing Sheets

Related U.S. Application Data continuation of application No. 14/326,765, filed on Jul. 9, 2014, now Pat. No. 9,306,898, which is a continuation of application No. 13/828,204, filed on Mar. 14, 2013, now Pat. No. 8,799,361, which is a continuation of application No. 13/085,841, filed on Apr. 13, 2011, now Pat. No. 8,751,589, which is a continuation of application No. 13/085,708, filed on Apr. 13, 2011, now Pat. No. 8,542,097.

(51) Int. Cl.
*H04W 4/20* (2009.01)
*H04L 29/08* (2006.01)
*H04L 12/58* (2006.01)
*H04L 29/06* (2006.01)
*H04W 4/00* (2009.01)
*H04W 88/02* (2009.01)

(52) U.S. Cl.
CPC ............ *H04L 67/12* (2013.01); *H04L 67/18* (2013.01); *H04W 4/008* (2013.01); *H04W 4/023* (2013.01); *H04W 4/028* (2013.01); *H04W 4/206* (2013.01); *H04W 88/02* (2013.01)

(56) References Cited

U.S. PATENT DOCUMENTS

| | | |
|---|---|---|
| 5,045,861 A | 9/1991 | Duffett-Smith |
| 5,052,943 A | 10/1991 | Davis |
| 5,124,915 A | 6/1992 | Krenzel |
| 5,173,691 A | 12/1992 | Sumner |
| 5,182,555 A | 1/1993 | Sumner |
| 5,184,314 A | 2/1993 | Kelly et al. |
| 5,218,188 A | 6/1993 | Hanson |
| 5,235,633 A | 8/1993 | Dennison et al. |
| 5,313,200 A | 5/1994 | Sone |
| 5,334,974 A | 8/1994 | Simms et al. |
| 5,402,117 A | 3/1995 | Zijderhand |
| 5,414,432 A | 5/1995 | Penny, Jr. et al. |
| 5,465,038 A | 11/1995 | Register |
| 5,497,148 A | 3/1996 | Olivia |
| 5,504,482 A | 4/1996 | Schreder |
| 5,504,589 A | 4/1996 | Montague et al. |
| 5,524,081 A | 6/1996 | Paul |
| 5,526,357 A | 6/1996 | Jandrell |
| 5,539,395 A | 7/1996 | Buss et al. |
| 5,539,645 A | 7/1996 | Mandhyan et al. |
| 5,559,520 A | 9/1996 | Barzegar et al. |
| 5,561,704 A | 10/1996 | Salimando |
| 5,566,226 A | 10/1996 | Mizoguchi et al. |
| 5,589,838 A | 12/1996 | McEwan |
| 5,594,432 A | 1/1997 | Olivia et al. |
| 5,673,039 A | 9/1997 | Pietzsch et al. |
| 5,694,335 A | 12/1997 | Hollenberg |
| 5,774,827 A | 6/1998 | Smith, Jr. et al. |
| 5,812,069 A | 9/1998 | Albrecht et al. |
| 5,845,227 A | 12/1998 | Peterson |
| 5,862,509 A | 1/1999 | Desai et al. |
| 5,889,477 A | 3/1999 | Fastenrath |
| 5,902,350 A | 5/1999 | Tamai et al. |
| 5,907,293 A | 5/1999 | Tognazzini |
| 5,926,113 A | 7/1999 | Jones et al. |
| 5,930,474 A | 7/1999 | Dunworth et al. |
| 5,936,553 A | 8/1999 | Kabel |
| 5,959,577 A | 9/1999 | Fan et al. |
| 5,982,298 A | 11/1999 | Lappenbusch et al. |
| 5,987,374 A | 11/1999 | Akutsu et al. |
| 5,987,377 A | 11/1999 | Westerlage et al. |
| 6,084,543 A | 7/2000 | Lizuka |
| 6,091,956 A | 7/2000 | Hollenberg |
| 6,101,443 A | 8/2000 | Kato et al. |
| 6,107,940 A | 8/2000 | Grimm |
| 6,150,961 A | 11/2000 | Alewine et al. |
| 6,151,550 A | 11/2000 | Nakatani |
| 6,157,814 A | 12/2000 | Hymel |
| 6,188,956 B1 | 2/2001 | Walters |
| 6,208,932 B1 | 3/2001 | Ohmura et al. |
| 6,240,555 B1 | 5/2001 | Shoff |
| 6,266,442 B1 | 7/2001 | Laumeyer et al. |
| 6,275,231 B1 | 8/2001 | Obradovich |
| 6,353,398 B1 | 3/2002 | Amin |
| 6,405,126 B1 | 6/2002 | Palomo et al. |
| 6,453,420 B1 | 9/2002 | Collart |
| 6,466,862 B1 | 10/2002 | DeKock et al. |
| 6,505,046 B1 | 1/2003 | Baker |
| 6,574,548 B2 | 6/2003 | DeKock et al. |
| 6,699,188 B2 | 3/2004 | Wessel |
| 6,785,551 B1 | 8/2004 | Richard |
| 6,785,606 B2 | 8/2004 | DeKock et al. |
| 6,912,398 B1 | 6/2005 | Domnitz |
| 6,944,621 B1 | 9/2005 | Collart |
| 6,993,573 B2 | 1/2006 | Hunter |
| 7,069,238 B2 | 6/2006 | I'Anson |
| 7,221,939 B2 | 5/2007 | Ylitalo |
| 7,224,961 B2 | 5/2007 | Ishii |
| 7,339,940 B2 | 3/2008 | Boberg |
| 7,343,165 B2 | 3/2008 | Obradovich |
| 7,359,737 B2 | 4/2008 | Ishii |
| 7,379,760 B2 | 5/2008 | Ishii |
| 7,409,282 B2* | 8/2008 | Lee ............... G01C 21/00 701/408 |
| 7,415,424 B1 | 8/2008 | Donner |
| 7,422,147 B2 | 9/2008 | Rosenbaum |
| 7,441,203 B2 | 10/2008 | Othmer |
| 7,469,155 B2 | 12/2008 | Chu |
| 7,475,057 B1 | 1/2009 | Obradovich |
| 7,505,992 B2 | 3/2009 | Collart |
| 7,516,094 B2 | 4/2009 | Perkowski |
| 7,574,493 B2 | 8/2009 | Hutchenson |
| 7,577,677 B2 | 8/2009 | Collart |
| 7,589,628 B1 | 9/2009 | Brady, Jr. |
| 7,593,740 B2 | 9/2009 | Crowley et al. |
| 7,636,779 B2* | 12/2009 | Hayashi ............ G06F 17/30867 707/999.003 |
| 7,664,516 B2 | 2/2010 | Levi et al. |
| 8,010,418 B1* | 8/2011 | Lee ............... G06Q 30/02 705/26.7 |
| 8,155,679 B2 | 4/2012 | Levi et al. |
| 8,229,470 B1* | 7/2012 | Ranjan ............ H04W 4/028 455/456.3 |
| 8,260,315 B2* | 9/2012 | Fortescu ............ G06Q 30/02 455/456.1 |
| 2001/0001160 A1 | 5/2001 | Shoff |
| 2001/0016483 A1 | 8/2001 | Nakajima |
| 2002/0059266 A1 | 5/2002 | I'anson |
| 2002/0128908 A1 | 9/2002 | Levin et al. |
| 2002/0154759 A1 | 10/2002 | Ishii |
| 2003/0032409 A1 | 2/2003 | Hutchenson |
| 2003/0050837 A1 | 3/2003 | Kim |
| 2003/0109252 A1 | 6/2003 | Prentice et al. |
| 2003/0126150 A1 | 7/2003 | Chan |
| 2003/0144022 A1 | 7/2003 | Hatch |
| 2004/0002897 A1 | 1/2004 | Vishik |
| 2004/0210824 A1 | 10/2004 | Shoff |
| 2005/0015815 A1 | 1/2005 | Shoff |
| 2005/0082370 A1 | 4/2005 | Frantz |
| 2005/0197968 A1 | 9/2005 | Das |
| 2005/0239448 A1 | 10/2005 | Bayne |
| 2005/0248469 A1 | 11/2005 | DeKock et al. |
| 2005/0256781 A1 | 11/2005 | Sands |
| 2005/0267809 A1 | 12/2005 | Zheng |
| 2006/0026067 A1 | 2/2006 | Nicholas |
| 2006/0052091 A1 | 3/2006 | Onyon |
| 2006/0058942 A1* | 3/2006 | Lee ............... G01C 21/00 701/517 |
| 2006/0089163 A1 | 4/2006 | Khawand et al. |
| 2006/0116779 A1 | 6/2006 | Seo |
| 2006/0270421 A1 | 11/2006 | Phillips |
| 2007/0015518 A1 | 1/2007 | Winter |
| 2007/0032244 A1* | 2/2007 | Counts ............ H04W 8/14 455/456.1 |

(56) References Cited

U.S. PATENT DOCUMENTS

| | | |
|---|---|---|
| 2007/0087736 A1 | 4/2007 | Wilson |
| 2007/0130279 A1 | 6/2007 | Thatcher |
| 2007/0136761 A1 | 6/2007 | Basmajian, II |
| 2007/0153987 A1 | 7/2007 | Cameron |
| 2007/0174243 A1 | 7/2007 | Fritz |
| 2007/0192294 A1 | 8/2007 | Ramer |
| 2007/0210156 A1 | 9/2007 | Bochicchio |
| 2007/0237096 A1 | 10/2007 | Vengroff et al. |
| 2008/0052189 A1 | 2/2008 | Walker |
| 2008/0082421 A1 | 4/2008 | Onyon |
| 2008/0093460 A1 | 4/2008 | Frantz |
| 2008/0102856 A1* | 5/2008 | Fortescue ............. G06Q 30/02 455/456.1 |
| 2008/0104227 A1* | 5/2008 | Birnie .................... H04W 4/02 709/224 |
| 2008/0119564 A1 | 5/2008 | McGlynn et al. |
| 2008/0133336 A1 | 6/2008 | Altman |
| 2008/0162731 A1 | 7/2008 | Kauppinen |
| 2008/0167921 A1 | 7/2008 | Seo |
| 2008/0183571 A1 | 7/2008 | Aaron |
| 2008/0207263 A1 | 8/2008 | May |
| 2008/0215436 A1 | 9/2008 | Roberts |
| 2008/0215725 A1 | 9/2008 | Backer |
| 2008/0235230 A1 | 9/2008 | Maes |
| 2008/0262945 A1 | 10/2008 | Clark |
| 2008/0318592 A1 | 12/2008 | Mandalia |
| 2009/0047972 A1* | 2/2009 | Neeraj ................... G06Q 10/10 455/456.1 |
| 2009/0104920 A1 | 4/2009 | Moon |
| 2009/0112708 A1 | 4/2009 | Barhydt |
| 2009/0119136 A1 | 5/2009 | Colson |
| 2009/0119164 A1 | 5/2009 | Colson |
| 2009/0167559 A1 | 7/2009 | Gaddy |
| 2009/0197577 A1 | 8/2009 | Agre |
| 2009/0198608 A1 | 8/2009 | Jain |
| 2009/0207015 A1* | 8/2009 | Diem ..................... G06Q 10/00 340/539.13 |
| 2009/0286553 A1 | 11/2009 | Northway et al. |
| 2009/0287404 A1 | 11/2009 | DeKock et al. |
| 2009/0287558 A1 | 11/2009 | Seth et al. |
| 2010/0216491 A1* | 8/2010 | Winkler ................. G06Q 10/10 455/457 |
| 2010/0253544 A1 | 10/2010 | DeKock et al. |
| 2010/0325276 A1* | 12/2010 | Aarni ...................... G06F 9/54 709/226 |
| 2011/0015853 A1 | 1/2011 | DeKock et al. |
| 2011/0083101 A1* | 4/2011 | Sharon ................ G06F 21/6245 715/800 |
| 2011/0136505 A1* | 6/2011 | Stewart .................. G06Q 50/01 455/456.1 |
| 2011/0136506 A1* | 6/2011 | Stewart .................. G06Q 50/01 455/456.1 |
| 2011/0173055 A1 | 7/2011 | Ross et al. |
| 2011/0173072 A1 | 7/2011 | Ross et al. |
| 2011/0238755 A1* | 9/2011 | Khan ..................... G06Q 50/01 709/204 |
| 2012/0047011 A1* | 2/2012 | Rippetoe ............... G06Q 30/02 705/14.45 |
| 2012/0065884 A1* | 3/2012 | Sung ..................... G06Q 10/06 701/517 |
| 2012/0166964 A1* | 6/2012 | Tseng ..................... G06F 3/048 715/745 |
| 2012/0220314 A1* | 8/2012 | Altman .............. G06Q 30/0207 455/456.3 |
| 2012/0262276 A1 | 10/2012 | Ross et al. |
| 2012/0265841 A1 | 10/2012 | Ross et al. |
| 2012/0270563 A1* | 10/2012 | Sayed .................... H04W 4/021 455/456.3 |
| 2012/0295645 A1* | 11/2012 | Yariv .................... H04L 67/322 455/466 |
| 2013/0035116 A1 | 2/2013 | Hymel et al. |
| 2013/0041761 A1* | 2/2013 | Voda ................. G06Q 30/0259 705/14.68 |
| 2013/0072226 A1* | 3/2013 | Thramann ............. H04W 4/028 455/456.1 |

FOREIGN PATENT DOCUMENTS

| | | |
|---|---|---|
| WO | 2005112586 A2 | 12/2005 |
| WO | 2007079307 A2 | 7/2007 |
| WO | 2008076381 A1 | 6/2008 |
| WO | 2008110218 A1 | 9/2008 |
| WO | 2009005273 A2 | 1/2009 |
| WO | 2009099916 A2 | 8/2009 |
| WO | 2011085304 A1 | 7/2011 |

OTHER PUBLICATIONS

Written Opinion of the International Searching Authority relating to International Application No. PCT/US12/33611, mailed Jul. 11, 2012.

International Search Report, dated Mar. 18, 2011 for PCT/US11/20669.

Written Opinion of the International Searching Authority, dated Mar. 18, 2011 for PCT/US11/20669.

Torrentfreak, Torrent Droid: Scan Barcodes, Get Torrents, Mar. 11, 2009, TorrentFreak.com, U.S.A.

Wojciechowski et al, Barcode Scanning from Mobile-Phone Camera Photos Delivered Via MMS: Case Study. Oct. 10, 2008, U.S.A.

Decker, Generalized Notification Services: A Simple but Versatile Paradigm for the Implementation of Mobile Data Services, 2006, Institute AIFB: University of Karlsruhe, U.S.A.

Michael et al, Mobile Marketing: Achieving Competitive Advantage through Wireless Technology, 2006, U.S.A.

Claire Cain Miller, Mobile Phones Become Essential Tool for Holiday Shopping, Dec. 18, 2009, NY Times, U.S.A.

International Search Report of the International Searching Authority relating to International Application No. PCT/US11/20669, mailed Mar. 18, 2011.

Written Opinion of the International Searching Authority relating to International Application No. PCT/US11/20669, mailed Mar. 18, 2011.

U.S. Appl. No. 61/293,501, filed Jan. 8, 2010.

* cited by examiner

SYSTEMS AND METHODS FOR TRANSMITTING INFORMATION, ALERTS, AND/OR COMMENTS TO PARTICIPANTS BASED ON LOCATION INFORMATION

CROSS-REFERENCE TO RELATED APPLICATIONS

This application is a continuation of U.S. Non-Provisional application Ser. No. 15/045,016, filed Feb. 16, 2016, now issued as U.S. Pat. No. 9,420,560, which is a continuation of U.S. Non-Provisional application Ser. No. 14/326,765, filed Jul. 9, 2014, now issued as U.S. Pat. No. 9,306,898, which is a continuation U.S. Non-Provisional application Ser. No. 13/828,204, filed Mar. 14, 2013, now issued as U.S. Pat. No. 8,799,361, which is a continuation of U.S. Non-Provisional patent application Ser. No. 13/085,841, filed Apr. 13, 2011, now issued as U.S. Pat. No. 8,751,589, which is a continuation of U.S. Non-Provisional patent application Ser. No. 13/085,708, filed Apr. 13, 2011, now issued as U.S. Pat. No. 8,542,097, the contents of each of these applications incorporated herein by reference in their entirety.

FIELD

The present invention relates to systems and methods for transmitting information, alerts, and/or comments to participants based on location information.

SUMMARY

In exemplary embodiments, a system can comprise database(s), stored on memory(s), that can comprise spot alert(s) data information that can correspond to spot alert(s), wherein the spot alert(s) data information can comprise for each respective spot alert(s) at least the following information (i) respective spot location information, (ii) respective spot range information, (iii) respective spot comment information, and/or (iv) respective spot approved recipient information.

In exemplary embodiments, the system can also comprise computer(s) operably connected to the database(s), and/or the computer(s) can comprise processor readable memory(s), wherein the processor readable memory(s) can store processor readable instructions that, for example, when executed, can cause the computer(s) to perform, amongst other things, the steps of: (1) receiving, via communication portal(s) operatively connected to the processor readable memory(s), from a recipient mobile electronic device(s), recipient mobile electronic device(s) information that can comprise (i) a recipient mobile electronic device(s) location information that can correspond to the recipient mobile electronic device(s) and/or (ii) a recipient mobile electronic device(s) identification information that can correspond to the identity associated with the recipient mobile electronic device(s) and/or a user of the recipient mobile electronic device(s); (2) analyzing the recipient mobile electronic device(s) information and/or the spot alert(s) data information to, for example, identify spot alert(s) and/or respective spot comment information associated with said spot alert(s) wherein when the recipient mobile electronic device(s) identification information is, for example, within the respective spot approved recipient information for said spot alert(s) and/or the recipient mobile electronic device(s) location information is, for example, within parameters defined by the respective spot location information and/or the respective spot range information associated with said spot alert(s); (3) sending the respective spot comment information associated with said spot alert(s), via the communication portal(s), to the recipient mobile electronic device(s), for display on said recipient mobile electronic device(s).

In exemplary embodiments, the system can further comprise (c) recipient mobile electronic device(s) that can further comprise: recipient mobile electronic device(s) processor readable memory(s); recipient mobile electronic device(s) communications portals operatively connected to said recipient mobile electronic device(s) processor readable memory(s); recipient mobile electronic device(s) processors operably connected to the recipient mobile electronic device(s) processor readable memory(s) and/or the recipient mobile electronic device(s) communications portals. Further, in exemplary embodiments, the recipient mobile electronic device(s) processor readable memory(s) can store recipient mobile electronic device(s) processor readable instructions that, for example, when executed, can cause the recipient mobile electronic device(s) processors to perform, amongst other things, the steps of: (1) receiving, via the recipient mobile electronic device(s) communications portals, the respective spot comment information; and/or (2) displaying said respective spot comment information on the recipient mobile electronic device(s).

In exemplary embodiments, the recipient mobile electronic device(s) can comprise speaker(s), vibrator(s), and/or graphical user interface(s).

In exemplary embodiments, the respective spot comment information can comprise (i) an audio file(s) and/or (ii) vibration(s) that can be displayed on (i) the speaker(s) and/or (ii) vibrator(s).

In exemplary embodiments, the respective spot comment information can comprise a text file(s), an image file(s) and/or a video file(s) that can be displayed on the graphical user interface(s).

In exemplary embodiments, the respective spot comment information can comprise monophonic, polyphonic, sounds and/or voice-overs, and/or audio-visual file format(s).

In exemplary embodiments, the respective spot comment information can comprise monophonic, polyphonic, sounds and/or voice-overs, and/or audio-visual file format(s).

In exemplary embodiments, the respective spot comment information can comprise a video codec file format(s) used, for example, to encode video data, and/or a video codec file format(s) used, for example, to compress video data.

In exemplary embodiments, the recipient mobile electronic device(s) processor readable instructions can further comprise instructions that, for example, when executed, can cause the recipient mobile electronic device(s) to perform the steps of: (1) periodically identifying the recipient mobile electronic device(s) location information that can correspond to the recipient mobile electronic device(s) during a particular period of time; and/or (2) sending the recipient mobile electronic device(s) location information and/or the recipient mobile electronic device(s) identification information via the recipient mobile electronic device(s) communications portals to the computer(s).

In exemplary embodiments, the recipient mobile electronic device(s) communications portals can further comprise: a cellular antennae communications portal, a WiFi™ communications portal, a Bluetooth® communications portal, and/or a location communications portal.

In exemplary embodiments, the recipient mobile electronic device(s) processor readable instructions can further comprise instructions that, for example, when executed, can cause the recipient mobile electronic device(s) to perform the step of: (1) identifying the recipient mobile electronic device(s) location information that can correspond to the recipient mobile electronic device(s); and/or wherein the recipient mobile electronic device(s) location information is, for example, identified using (i) Global Positions Systems (GPS); (ii) GPS accessed using Bluetooth®; (iii) WiFi™ server location data; (iv) Bluetooth® based location data; (v) network based triangulation; (vi) WiFi™ server information based triangulation; (vii) Bluetooth® server information based triangulation; (viii) Cell Identification based triangulation, (ix) Enhanced Cell Identification based triangulation; (x) Uplink-Time difference of arrival based triangulation; (xi) Time of arrival based triangulation; and/or (xii) Angle of arrival based triangulation.

In exemplary embodiments, the system can further can comprise: (c) user electronic device(s) that can communicate with the computer(s), and/or the user electronic device(s) can comprise user electronic device processor readable memory(s); user electronic device communications portal(s) operatively connected to said user electronic device processor readable memory(s); user electronic device processor(s) operably connected to the user electronic device processor readable memory(s) and/or the user electronic device communications portal(s).

In exemplary embodiments, the processor readable instructions, when executed, can cause the computer(s) to perform the further steps of: (4) sending a notification(s) to user electronic device(s), via the communication portal(s), that can comprise information such as that the respective spot location information was sent to the recipient mobile electronic device(s).

In exemplary embodiments, the processor readable instructions when executed, can cause the computer(s) to perform the further steps of: (4) sending a report(s) to user electronic device(s), via the communication portal(s), that can comprise information regarding the transmission of respective spot comment(s) information sent to recipient mobile electronic device(s) during a period of time.

In exemplary embodiments, the report(s) can further comprise at least some of the recipient mobile electronic device(s) information, the respective spot approved recipient(s) information, the recipient mobile electronic device(s) location information, the respective spot location(s) information, the respective spot range(s) information, the spot comment(s), and/or the respective spot comment(s) information.

In exemplary embodiments, the report(s) can further comprise at least some information associated with a physiographic data; the perspective and/or impression of at least one of the user and/or recipient for any location; demographics; recipient mobile electronic device(s) location arrival information for any respective location; recipient mobile electronic device(s) location arrival information for any respective range; time within respective locations; recipient mobile electronic device(s) time information within respective ranges; interaction with at least one of others users and/or recipients; and/or information regarding the altering of system settings within locations.

In exemplary embodiments, at least some information received from the user electronic device(s), via communication portal(s), can modify (i) the respective spot location(s) information, (ii) the respective spot range(s) information, (iii) the respective spot comment(s) information, and/or (iv) the respective spot approved recipient(s) information.

In exemplary embodiments, the information received from the user electronic device creates, edits, and/or restricts the spot alert(s) data information based on, for example, the respective spot approved recipient(s) information.

In exemplary embodiments, the information can be received from and/or input via a social networking interface(s) and/or a social networking website(s).

In exemplary embodiments, the respective spot comment(s) information can comprise instructional information associated with the respective spot location(s) information.

In exemplary embodiments, the respective spot comment(s) information can comprise advertising information associated with the respective spot location(s) information.

In exemplary embodiments, the respective spot comment(s) information can comprise a text(s), image(s), audio(s), and/or video(s).

In exemplary embodiments, the respective spot comment(s) information can comprise monophonic, polyphonic, sounds and/or voice-overs, vibration, and/or audio-visual file format(s).

In exemplary embodiments, the respective spot comment(s) information can comprise, a video codec file format(s) used to encode video data, and/or a video codec file format(s) used to compress video data.

In exemplary embodiments, the respective spot approved recipient(s) information can comprise a single recipient, a plurality of recipients, a tiered level of recipients, and/or a nodal relationship of recipients.

In exemplary embodiments, the system can further comprise: (c) user electronic device(s) that can communicate with the computer(s), the user electronic device(s) that can comprise user electronic device processor readable memory(s); user electronic device communications portal(s) operatively connected to said user electronic device processor readable memory(s); user electronic device processor(s) operably connected to the user electronic device processor readable memory(s) and/or the user electronic device communications portal(s). In exemplary embodiments, the system can further comprise: (d) recipient mobile electronic device(s) that can further comprise: recipient mobile electronic device(s) processor readable memory(s); recipient mobile electronic device(s) communications portals operatively connected to said recipient mobile electronic device(s) processor readable memory(s); recipient mobile electronic device(s) processors operably connected to the recipient mobile electronic device(s) processor readable memory(s) and/or the recipient mobile electronic device(s) communications portals; wherein the memory(s) of (i) the user electronic device(s) and/or the (ii) recipient mobile electronic device(s) can store processor readable instructions that, for example, when executed, can cause the processors(s) of (i) the user electronic device(s) and/or the (ii) recipient mobile electronic device(s) to perform the step of: (1) transmitting, via the communications portal(s), at least one of (i) additional spot alert(s) data information and/or (ii) additional recipient mobile electronic device(s) information.

In exemplary embodiments, (i) additional spot alert(s) data information and/or (ii) additional recipient mobile electronic device(s) information can be aggregated and/or can be displayed on (i) the user electronic device(s) and/or the (ii) recipient mobile electronic device(s).

In exemplary embodiments, (i) additional spot alert(s) data information and/or (ii) additional recipient mobile electronic device(s) information can be aggregated and/or accessed on a social networking interface(s) and/or a social networking website(s) using (i) the user electronic device(s) and/or the (ii) recipient mobile electronic device(s).

In exemplary embodiments, an algorithm can adjusts the size of a geo-fence, wherein the geo-fence can be adjusted based on (1) at least one of users and/or recipients inside the geo-fence; (2) at least one of mobile electronic device recipients and/or users inside the geo-fence; and/or (3) at least one of mobile electronic device users and/or recipients having the system.

In exemplary embodiments, a system can comprise (a) database(s), stored on memory(s), that can comprise spot alert(s) data information that can correspond to spot alert(s), wherein the spot alert(s) data information can comprise for each respective spot alert(s) at least the following information (i) respective spot location(s) information, (ii) respective spot range(s) information, (iii) respective spot comment(s) information, (iv) respective spot approved recipient(s) information.

In exemplary embodiments, the system can also comprise (b) computer(s) operably connected to the database(s), the computer(s) can comprise processor readable memory(s), wherein the processor readable memory(s) can store processor readable instructions that, for example, when executed, can cause the computer(s) to perform the steps of: (1) receiving, via communication portal(s) operatively connected to the processor readable memory(s), from a recipient mobile electronic device(s), recipient mobile electronic device(s) information that can comprise a recipient mobile electronic device(s) identification information that can correspond to the identity associated with the recipient mobile electronic device(s) and/or a user of the recipient mobile electronic device(s); (2) analyzing the recipient mobile electronic device(s) information and/or the spot alert(s) data information to identify recipient mobile electronic device(s) relevant spot alert(s) from among the spot alert(s) data information, wherein when the recipient mobile electronic device(s) identification information is, for example, within the respective spot approved recipient(s) information for said recipient mobile electronic device(s) relevant spot alert(s); (3) sending respective spot location(s) information, respective spot range(s) information, and/or respective spot comment(s) information associated with said recipient mobile electronic device(s) relevant spot alert(s), via the communication portal(s) to the recipient mobile electronic device(s), for storage and/or potential display on said recipient mobile electronic device(s).

In exemplary embodiments, the system can further comprise (c) recipient mobile electronic device(s) that can further comprise: recipient mobile electronic device(s) processor readable memory(s); recipient mobile electronic device(s) communications portals operatively connected to said recipient mobile electronic device(s) processor readable memory(s); recipient mobile electronic device(s) processors operably connected to the recipient mobile electronic device(s) processor readable memory(s) and/or the recipient mobile electronic device(s) communications portals. Further, in exemplary embodiments, the recipient mobile electronic device(s) processor readable memory(s) can store recipient mobile electronic device(s) processor readable instructions that, for example, when executed, can cause the recipient mobile electronic device(s) processors to perform the steps of: (1) receiving, via the recipient mobile electronic device(s) communications portals, the respective spot location(s) information, the respective spot range(s) information, and/or the respective spot comment(s) information associated with said recipient mobile electronic device(s) relevant spot alert(s); (2) storing, in an electronic database located in the recipient mobile electronic device(s) processor readable memory(s), the respective spot location(s) information, the respective spot range(s) information, and/or the respective spot comment(s) information associated with said recipient mobile electronic device(s) relevant spot alert(s); (3) periodically identifying a recipient mobile electronic device(s) location information that can correspond to the recipient mobile electronic device(s) during a particular period of time; (4) analyzing the recipient mobile electronic device(s) identification information to identify recipient mobile electronic device(s) relevant spot alert(s); and/or respective spot comment(s) information associated with said recipient mobile electronic device(s) relevant spot alert(s); wherein when the recipient mobile electronic device(s) identification information is, for example, within the respective spot approved recipient(s) information for said at least on recipient mobile electronic device(s) relevant spot alert(s); and/or (5) displaying said respective spot comment(s) information on one or more displays of the recipient mobile electronic device(s).

In exemplary embodiments, the recipient mobile electronic device(s) can comprise speaker(s), vibrator(s), and/or graphical user interface(s).

In exemplary embodiments, the respective spot comment(s) information can comprise (i) an audio file(s) and/or (ii) vibration that can be displayed on at least one of (i) the speaker(s) and/or (ii) vibrator(s).

In exemplary embodiments, the respective spot comment(s) information can comprise text file(s), an image file(s) and/or a video file(s) that can be displayed on the graphical user interface(s).

In exemplary embodiments, the respective spot comment(s) information can comprise monophonic, polyphonic, sounds and/or voice-overs, and/or audio-visual file format(s).

In exemplary embodiments, the respective spot comment(s) information can comprise a video codec file format(s) used to encode video data, and/or a video codec file format(s) used to compress video data.

In exemplary embodiments, the recipient mobile electronic device(s) communications portals can further comprise: a cellular antennae communications portal, a WiFi™ communications portal, a Bluetooth® communications portal, and/or a location communications portal.

In exemplary embodiments, the step of: (1) identifying the recipient mobile electronic device(s) location information that can correspond to the recipient mobile electronic device(s), can be identified using (i) Global Positions Systems (GPS); (ii) GPS accessed using Bluetooth®; (iii) WiFi™ server location data; (iv) Bluetooth® based location data; (v) network based triangulation; (vi) WiFi™ server information based triangulation; (vii) Bluetooth® server information based triangulation; (viii) Cell Identification based triangulation, (ix) Enhanced Cell Identification based triangulation; (x) Uplink-Time difference of arrival based triangulation; (xi) Time of arrival based triangulation; and/or (xii) Angle of arrival based triangulation.

In exemplary embodiments, the system can further comprise: (c) user electronic device(s) that can communicate with the computer(s), the user electronic device(s) can comprise user electronic device processor readable memory(s); user electronic device communications portal(s) operatively connected to said user electronic device processor readable memory(s); user electronic device processor(s) operably connected to the user electronic device processor readable memory(s) and/or the user electronic device communications portal(s).

In exemplary embodiments, the processor readable instructions, for example, when executed, can cause the computer(s) to perform the further steps of: (4) sending a notification(s) to user electronic device(s), via the communication portal(s), that can comprise information that the respective spot location(s) information was sent to the recipient mobile electronic device(s).

In exemplary embodiments, the processor readable instructions, for example, when executed, can cause the computer(s) to perform the further steps of: (4) sending a report(s) to user electronic device(s), via the communication portal(s), that can comprise information regarding the transmission of respective spot comment(s) information sent to recipient mobile electronic device(s) during a period of time.

In exemplary embodiments, the report(s) can further comprise at least some of the recipient mobile electronic device(s) information, the respective spot approved recipient(s) information, the recipient mobile electronic device(s) location information, the respective spot location(s) information, the respective spot range(s) information, the at least one spot comment(s), and/or the respective spot comment(s) information.

In exemplary embodiments, the report(s) can further comprise at least some information associated with at least one of a physiographic data; at least one of the perspective and/or impression of at least one of the user and/or recipient for any location; demographics; recipient mobile electronic device(s) location arrival information for any respective location; recipient mobile electronic device(s) location arrival information for any respective range; time within respective locations; recipient mobile electronic device(s) time information within respective ranges; interaction with at least one of others users and/or recipients; and/or information regarding the altering of system settings within locations.

In exemplary embodiments, at least some information received from the user electronic device(s), via communication portal(s), can modify (i) the respective spot location(s) information, (ii) the respective spot range(s) information, (iii) the respective spot comment(s) information, and/or (iv) the respective spot approved recipient(s) information.

In exemplary embodiments, the information received from the user electronic device can create, edit, and/or restrict the spot alert(s) data information based on the respective spot approved recipient(s) information.

In exemplary embodiments, the information is received from and/or input via a social networking interface(s) and/or a social networking website(s).

In exemplary embodiments, the respective spot comment(s) information can comprise instructional information associated with the respective spot location(s) information.

In exemplary embodiments, the respective spot comment(s) information can comprise advertising information associated with the respective spot location(s) information.

In exemplary embodiments, the respective spot comment(s) information can comprise a text(s), image(s), audio(s), and/or video(s).

In exemplary embodiments, the respective spot comment(s) information can comprise monophonic, polyphonic, sounds and/or voice-overs, vibration, and/or audio-visual file format(s).

In exemplary embodiments, the respective spot comment(s) information can comprise, a video codec file format(s) used to encode video data, and/or a video codec file format(s) used to compress video data.

In exemplary embodiments, the respective spot approved recipient(s) information can comprise at least one of a single recipient, a plurality of recipients, a tiered level of recipients, and/or a nodal relationship of recipients.

In exemplary embodiments, the system can further comprise: an algorithm that can adjust the size of a geo-fence, wherein the geo-fence can be adjusted based on: (1) at least one of users and/or recipients inside the geo-fence; (2) at least one of mobile electronic device recipients and/or users inside the geo-fence; and/or (3) at least one of mobile electronic device users and/or recipients having the system.

BRIEF DESCRIPTION OF THE DRAWINGS

The features and advantages of the present invention will be more fully understood with reference to the following, detailed description when taken in conjunction with the accompanying figures, wherein.

DETAILED DESCRIPTION

The present invention generally relates to systems and methods for sharing information related to a location, also referred to herein as a "spot", such as spot alerts and/or spot comments (e.g., shared information, advertisements, etc.) received, displayed, played, and/or actuated, for example, on recipient mobile electronic devices proximately located to such location (e.g., spot). Users of the systems and methods can create spot alerts in which designated recipients can receive transmissions, such as spot alerts and/or spot comments (e.g., shared information, advertisements, etc.) that can be received, displayed, played, and/or actuated, for example, on respective recipient mobile electronic devices, when located within a proximity of a defined location (e.g., spot).

Further, in exemplary embodiments, both users and recipients, also referred to herein as "spotters" and/or "participants", can create spot alerts in which designated recipients can receive transmissions, such as spot comments on static electronic devices, such as user electronic devices, and/or, mobile electronic devices, such as recipient mobile electronic devices.

For ease, the terms users, recipients, and/or participants are, at times, described separately, however, it will be understood that any of the users, recipients, and/or participants can create and/or edit spot alerts, spot comments, and/or various create and/or edit other aspects of the present disclosure. This is merely for ease and is in no way meant to be a limitation.

Figure 1A:
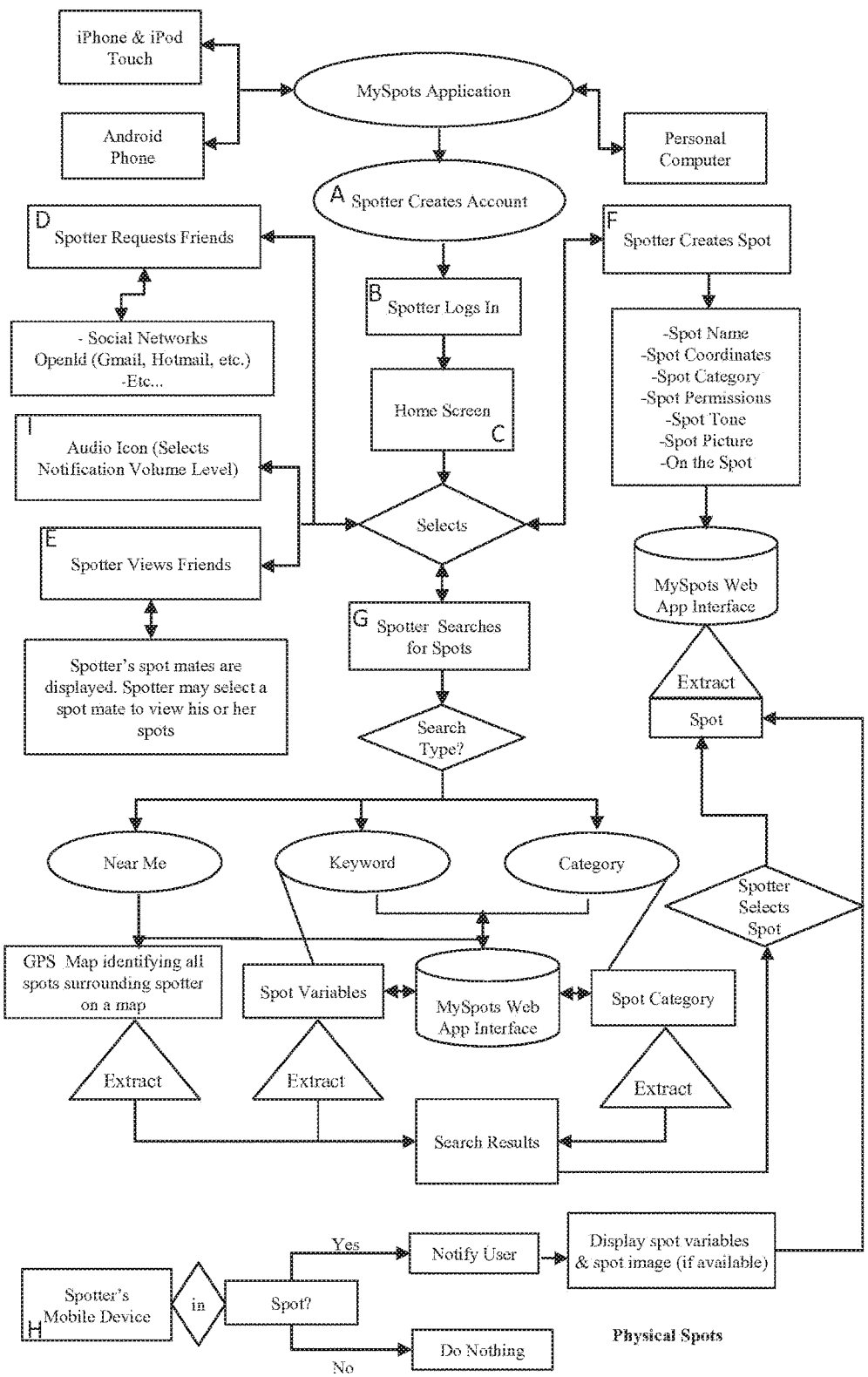
FIG. 1A is a flowchart illustrating a broad overview of various aspects of exemplary systems and methods disclosed herein, in accordance with exemplary embodiments of the present invention.

Referring to FIG. 1A, in exemplary embodiments, the systems and methods for sharing information can include various systems and/or methods that, amongst other things, can manage the content associated with locations (e.g., spots), for example, referring to steps A-I; can manage the content associated with physical location (e.g., spots), for example, referring to steps F, G, H; can manage the content associated with mates and/or spot mates (e.g., friends, approved recipients, etc.), for example, referring to steps D, I, E; and/or can manage the content associated with other information utilizing, for example, information from a web interface and/or applications interface (e.g., a social networking interface and/or website), recipient mobile electronic device, and/or a user electronic device, to name a few.

In exemplary embodiments, for example, referring to step F, as described in greater detail below, participants can create a single spot alert sending a single transmission (e.g., spot comment) at a single defined location, can create a single spot alert which sends a plurality of transmissions (e.g., spot comments) at one or more of defined locations, can create a plurality of such spot alerts, and/or can create any combinations of such spot alerts and/or spot comments, to name a few. In exemplary embodiments, the same transmission (e.g., spot comments) can be sent to all designated recipients and/or different tailored transmissions (e.g., spot comments) can be sent to different designated recipients and/or groups of recipients, as described below.

In exemplary embodiments, each spot alert can be sent to one or more specifically designated recipients. In exemplary embodiments, the recipients can be designated using identifying information, such as, but not limited to, email address, mobile electronic device number, and IP address, to name a few. Similarly, the recipients can be designated as any member of a group, such as anyone with an email address with one or more specified domain names (e.g., Harvard.edu, JingleTech.com, etc.), a domain name extension (e.g., .edu or .org, etc.), a mobile electronic device number with a certain area code and/or exchange and/or other defining characteristics to users of certain networks, and/or certain class of IP address, to name a few. Groups can be defined by other associations too.

In exemplary embodiments, for example, referring to step D, the location can be defined by designating a specific location and related range (e.g., 100 Main Street, Any town, Any state, USA, Area Code, Zip Code, Range, 0.5 mile range, etc.), as described below, by designating a zip code, a city, a village, a school district, a county, a state, a plurality of the same, and/or a combination of such designations, to name a few.

In exemplary embodiments, a user create and/or edit one or more spot alerts using an account to access the systems and methods either directly and/or through another website, such as a social networking interface and/or website, like Facebook, LinkedIn, or the like. Further, to access the systems and methods, users can be required to input user account information that can include, but is not limited to, such items as e-mail address and/or phone number, name (first and/or last), user name, and password, to name a few. Different or other user information can be used to create and/or edit an account by a system operator consistent with the spirit and scope of the present invention. Such information can be modified by user over time as appropriate.

In exemplary embodiments, involving the use of one or more social networking interface and/or websites, a user can connect to other potential recipients. By way of illustrating, in the context of a social networking interface and/or website like Facebook, the user can send requests and/or receive requests from others to become friends ("mates"), as one method of connecting or identifying potential recipients. Such connections can further be identified as relating to groups created by the user or others, wherein such groups can be used to create recipient lists ("spot mates").

In exemplary embodiments, a user can create and/or edit one or more spot alerts by using information such as, but not limited to, mobile recipient device information, mobile recipient device location information, mobile recipient device identification information, location information, spot alert data information, respective spot location information, respective spot range information, respective spot comment information, and respective spot approved recipient information, to name a few. The spot alert can be identified by the user, for example, by name, number, and/or other designation, to name a few. Further, the spot alert can be identified by the system automatically, for example, using an identification number and/or other designation to identify, create, and/or edit the spot alert. The spot alert can also be identified by including audio and/or visual information associated with the spot alert such as, but not limited to, a picture, a video, a tone, a jingle, and/or other sound and/or image, to name a few. The spot alert location can include specific coordinates, and/or other forms of identifying information, to name a few.

As discussed below, spot alerts can include various permission for various information that can include, but is not limited to, information such as, but not limited to, mobile recipient device information, mobile recipient device location information, mobile recipient device identification information, location information, spot alert data information, respective spot location information, respective spot range information, respective spot comment information, and respective spot approved recipient information, to name a few. In exemplary embodiments, various permissions for various information can be tiered such that different recipients are entitled to receive access to different spot alert data information and/or various information at the same and/or different locations from other approved recipients.

Figure 1B:
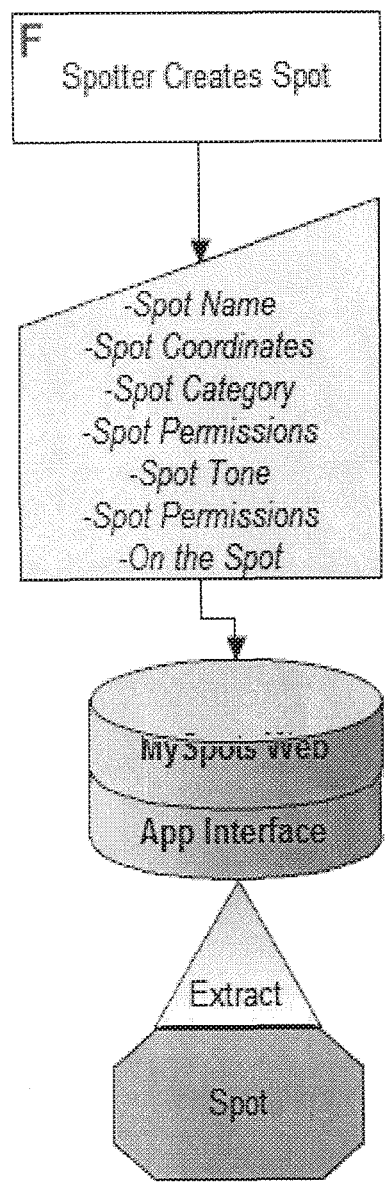
FIG. 1B is a flow chart illustrating participants (e.g., spotters) creating exemplary locations (e.g., spots), in accordance with exemplary embodiments of the present invention.

Referring to FIG. 1B, in exemplary embodiments, for example, referring to step F, a participant (e.g., user who originates a spot, user who creates a location, etc.) can create locations (e.g., spots) by, for example, being in the physical location of the spot they wish to create with a mobile electronic device, referred to as mobile electronic device spot creation and/or by manually entering the variables affiliated with a spot from a static electronic device, referred to as static electronic device creation.

In exemplary embodiments, the process for creating a spot can be substantially similar whether done utilizing a mobile electronic device and/or static electronic device. In exemplary embodiments, where a mobile electronic device is used, locations (e.g., spots) can be generated by using location information affiliated with the mobile electronic device, such as GPS. In exemplary embodiments, where a static electronic device is used, a spot can be generated by using location information affiliated with the static electronic device, such as IP address. In exemplary embodiments, using a mobile electronic device and/or a static electronic device, coordinates can be entered manually by the participant in appropriate forms, such as, but not limited to, the form of an address, latitude coordinates, and/or longitude coordinates, to name a few. In exemplary embodiments, the systems and methods disclosed can utilize a location based API or other application, such as Google Maps to, for example, display locations (e.g., spots) graphically.

Further, in exemplary embodiments, each spot can include variables including, but not limited to, spot name, spot coordinates, spot category, spot permissions, spot tone, spot picture, and on the spot, to name a few. In exemplary embodiments, a participant who creates a spot and/or location can be referred to as the spot originator and/or location originator. The spot can be given a name that can be a descriptive title given by the spot originator and/or location originator to describe a given spot. Spot coordinates can be the Cartesian grid (e.g., GPS coordinates) coordinates of a spot.

In exemplary embodiments, spots can be categorized (e.g., spot categories) that can define the classification of a spot (e.g., spot food, spot fun, spot shop, spot drink, spot entertainment, spot activity, a spot experiences, etc.). Spot permissions can define which spot mates and/or mates have access to a given spot. A spot tone can be a ring tone and/or a participant recorded audio segment, designated by the spot originator and/or location originator, which plays when a spot alert and/or spot comment is, for example, activated. An audio (e.g., a spot recording) and/or visual transmission (e.g., a spot picture, a spot video, etc.) can be attached and/or created any participant, for example, when they are writing at a spot and/or location and when creating and/or editing information about a spot and/or location, to name a few. Various transmissions from various participants can be aggregated into a feed of comments, submitted by participants, and/or displayed uniquely for each individual spot, to name a few.

Figure 1C:
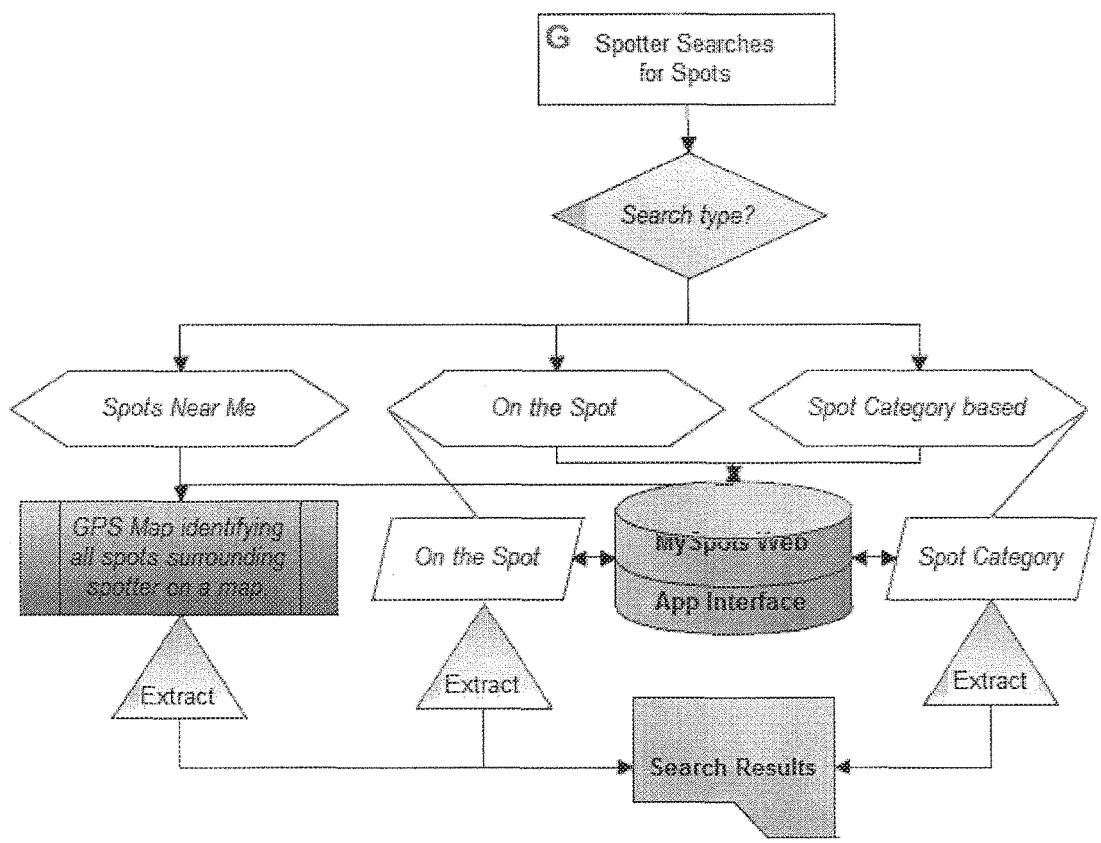
FIG. 1C is a flow chart illustrating participants searching exemplary locations (e.g., spots), in accordance with exemplary embodiments of the present invention.

Referring to FIG. 1C, in exemplary embodiments, for example, referring to step G, locations (e.g., spots) can be searched using various techniques such as, but not limited, to a near me search, a keyword search, and/or a category search, to name a few. Searches can access the pre-existing web application interface to retrieve the data regarding variables affiliated with various spots, locations, spot alerts, and spot comments, to name a few. A near me search can allow a participant to search for locations (e.g., spots) they have permission to access. For example, this search method can provide the participant with a map identifying locations (e.g., spots) surrounding them on a map based on, for example, their current GPS location.

In exemplary embodiments, cache location (e.g., spot) can be identified by a color code that can be directly correlated to a category affiliated with that location. These category color codes can be assigned by participants and/or can be automatically assigned, for example, at a later date, by participants, and/or by any of the systems and/or methods disclosed, to name a few.

In exemplary embodiments, a keyword search can allow participants to search all of their spot mates' locations (e.g., spots) based participant input, for example, a defined string of text. By way of example, if this defined string of text appears in the spot of any spot mates' locations (e.g., spots), and in which the participant has been given the appropriate spot permissions, that spot can then appear in the keyword search results.

In exemplary embodiments, a category search can allow participants to search all of their spot mates' locations (e.g., spots) based on categories affiliated with various spots. By way of example, if the requested spot category matches any spot mates' locations (e.g., spots), and which the participant has been given the appropriate spot permissions, that spot can appear in the category search results. Further, in exemplary embodiments, spot search results can be sorted by the distance from the current location of the participant.

Figure 1D:
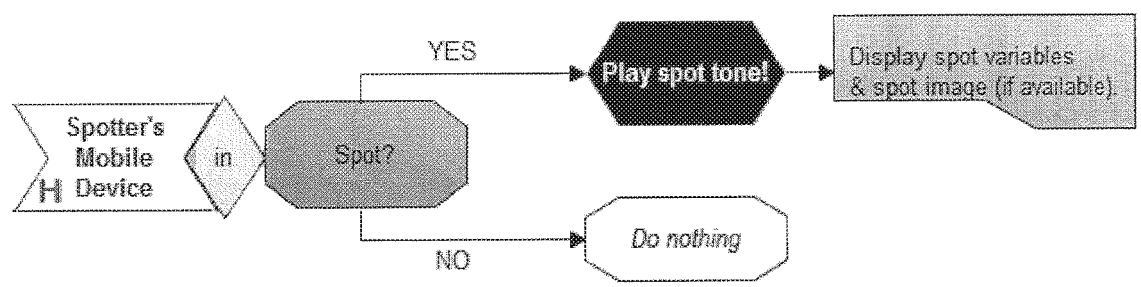
FIG. 1D is a flow chart illustrating recipient mobile electronic devices being detected, in accordance with exemplary embodiments of the present invention.

Referring to FIG. 1D, in exemplary embodiments, for example, referring to step H, when a participant physically enters into the area of a spot, that they have the proper permissions to access with a mobile electronic device, they can receive a spot alert and/or spot comment on their mobile electronic device. As discussed below, this spot alert and/or spot comment can consist of a spot ringtone/jingle, picture, light box, etc., to name a few. Further, after receiving the spot notification, the participant can then be able to view the spot variables, write about the spot (e.g., while on that spot), create and/or edit other information, and/or upload their own spot transmissions (e.g., pictures, audio transmissions, video transmissions, etc.), to name a few. In exemplary embodiments, participants can opt out of any spot. Participants can also create additional locations (e.g., spots) and/or create additional spot alerts and/or spot comments for various locations.

In exemplary embodiments, the systems and methods can transmit spot alerts and/or spot comments, based on spot alert data information, such that recipient mobile electronic devices can have spot alerts and/or spot comments received, displayed, played, and/or actuated, for example, when that recipient mobile electronic device is located within a spot location and/or predefined range from a predetermined location. This spot alert data information can be based on variables such as, but not limited to information such as, but not limited to, mobile recipient device information, mobile recipient device location information, mobile recipient device identification information, location information, spot alert data information, respective spot location information, respective spot range information, respective spot comment information, and respective spot approved recipient information, and any other form of information affiliated with any number of locations that can be analyzed to determine whether spot alerts and/or spot comments should be transmitted to recipient mobile electronic devices.

In exemplary embodiments, the spot alert data information can include respective spot approved recipient information such that a user can restrict the transmission of spot comments based on variables, such as, but not limited to, spot alert data information, respective spot location information, respective spot range information, respective spot comment information, and respective spot approved recipient information, to name a few. Further, in exemplary embodiments, the user can restrict the transmission of spot comments to specific recipients, groups of recipients, and/or tiers of recipients, to name a few.

In exemplary embodiments, to input information, such as a user restricting the transmission of spot comments, users, amongst others, can access a website, such as, a social networking interface and/or website that can include automatically populated information, for example, using user electronic devices. Further, in exemplary embodiments, to input information, such as add locations, spot comments, and spot alert data information, to name a few, users and/or recipients, amongst others, can access a website and/or application, such as a social networking interface and/or website, for example, using recipient mobile electronic devices.

In exemplary embodiments, the inputting of information can be from users and recipients such that information can be created, modified, edited, deleted and/or aggregated using user electronic devices and/or recipient mobile electronic devices. Further, information can be received from, transmitted to, and/or input using a website, such as, a social networking interface and/or website, e-mail providers, contact lists, and/or any other source of information, to name a few.

In exemplary embodiments, participants can update spot alerts and/or spot comments based on the location of other participants. For example, if a recipient is detected as having passed a location (e.g., using triangulation), another participant can transmit a spot alert and/or spot comment to that recipient. By way of example, if a recipient is detected as having missed a location (e.g., a turn off point on route to a ski house) a user can create a spot alert and/or transmission alerting the user that they have missed the location. Of course other participants and/or the systems and/or methods can automatically and/or in response to another participant missing a location create a spot alert and/or spot comment.

Figure 1E:
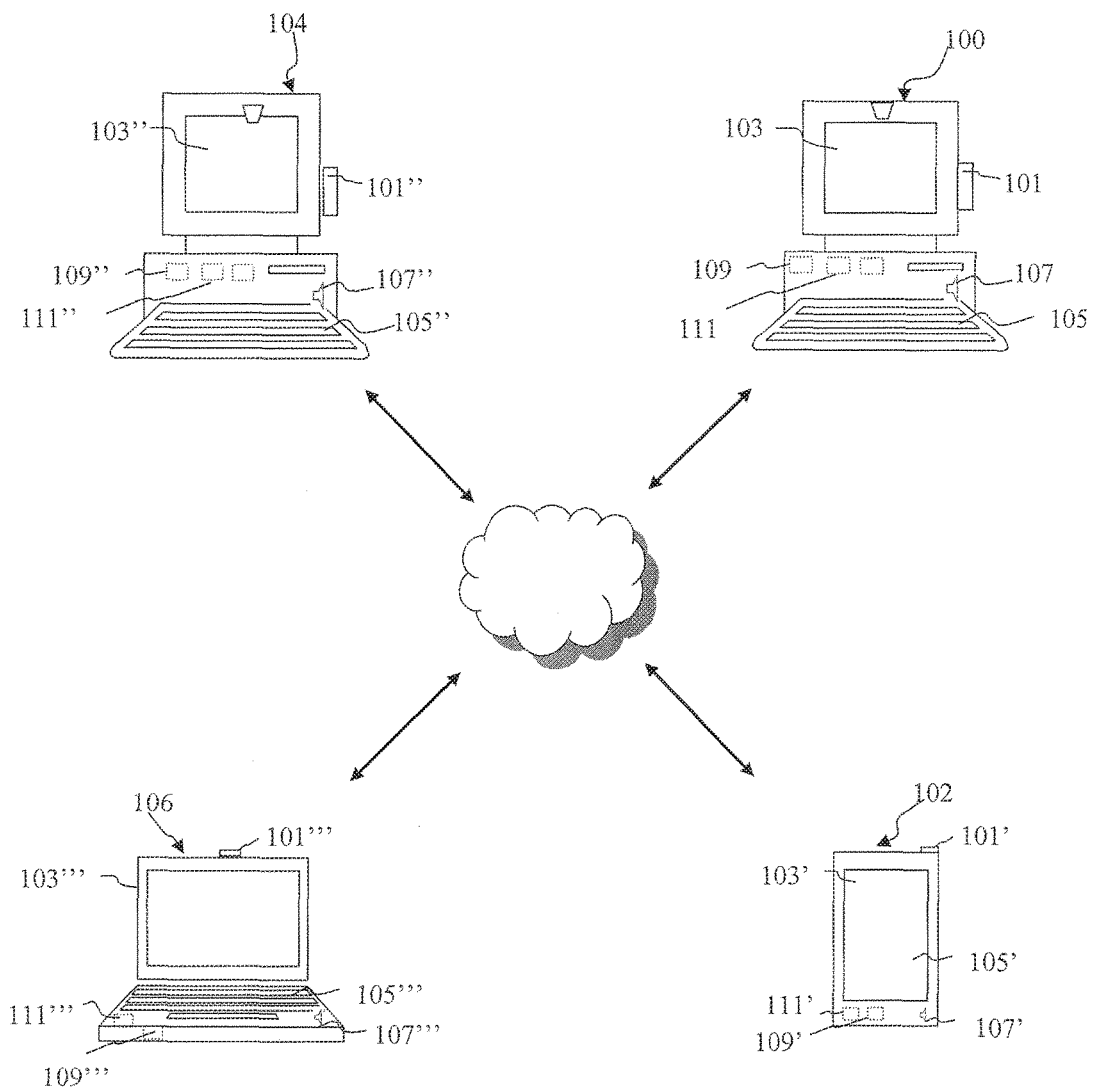
FIG. 1E is a block diagram of certain components of the systems and methods for transmitting information, spot alerts and/or spot comments to recipient mobile electronic devices based on location information, in accordance with exemplary embodiments of the present invention.

Referring to FIG. 1E, it will be understood that any of location system 100, mobile recipient device 102, website provider system 104, and/or user electronic device 106 can communicate with each other and/or can be further combined and/or separated. For ease, location system 100, mobile recipient device 102, website provider system 104, and/or user electronic device 106 are, at times, described separately. This is merely for ease and is in no way meant to be a limitation.

Further, in exemplary embodiments, any element of location system 100, mobile recipient device 102, website provider system 104, and/or user electronic device 106 can reside on and/or be affiliated with location system 100, mobile recipient device 102, website provider system 104, and/or user electronic device 106. For example, website provider system 104 can include an algorithm, for example, processor readable instructions stored in processor readable memory that can be accessed and/or processed by one or more processors affiliated with mobile recipient device 102 and/or user electronic device 106. For another example, an algorithm, for example, processor readable instructions can stored in processor readable memory that can be accessed and/or processed by one or more processors affiliated with mobile recipient device 102 and/or user electronic device 106.

As shown, in exemplary embodiments, location system 100, mobile recipient device 102, website provider system 104, and/or user electronic device 106 can include, but is not limited to, at least one communications portal 101, 101', 101", 101'''; at least one graphical user interface 103, 103', 103", 103'''; at least one user input 105, 105', 105", 105'''; at least one speaker 107, 107', 107", 107'''; at least one vibrator mechanism (not shown) at least one processor readable memory 109, 109', 109", 109'''; at least one processor 111, 111', 111", 111'''; and any other reasonable components for use in communicating information (e.g., data), storing information, and/or processing any form of information.

In exemplary embodiments, graphical user interface 103, 103', 103", 103''' and user input 105, 105', 105", 105''' can be substantially the same. For example, graphical user interface 103, 103', 103", 103''' and user input 105, 105', 105", 105''' can be combined as a touch distribution system. The touch distribution system can be a display that can detect the presence and location of a touch within the distribution system area.

In exemplary embodiments, location system 100, mobile recipient device 102, website provider system 104, and/or user electronic device 106 can be, for example, a mobile phone, computer, server, iPad, iPod, iPhone, Smartphone, tablet, pager, and blackberry, to name a few.

Further, location system 100, mobile recipient device 102, website provider system 104, and/or user electronic device 106 can be operably to connected to and/or include electronic databases, for example, including processor readable memory, wherein the processor readable memory can store processor readable instructions that, when executed, cause location system 100, mobile recipient device 102, website provider system 104, and/or user electronic device 106 to perform the various steps. Further still, location system 100, mobile recipient device 102, website provider system 104, and/or user electronic device 106 a plurality of electronic database, subsystems and/or libraries, such as, but not limited to, recipient mobile electronic device location information subsystem, respective spot location information subsystem, respective spot range information subsystem, respective spot comment information subsystem, and/or respective spot approved recipient information subsystem, to name a few.

In exemplary embodiments, location system 100, mobile recipient device 102, website provider system 104, and/or user electronic device 106 can be associated with and/or controlled by a web based administration portal and/or other administration device that can be configured to a web services layer that can include, but is not limited to, apache, php, memcached my sql database and/or any other programming configuration, software language, and/or operating system. Further, any of location system 100, mobile recipient device 102, website provider system 104, and/or user electronic device 106 can operate on a siloed sever and/or cloud computing basis.

In exemplary embodiments, location system 100, mobile recipient device 102, website provider system 104, and/or user electronic device 106 can collect, manage, report, and/or administrate users and/or recipients interaction with any of location system 100, mobile recipient device 102, website provider system 104, and/or user electronic device 106 in real time.

The terms "spot comments", "comments information", "respective spot comment information", "respective comments information", "spot alerts", "respective spot comment information associated with spot alerts", and the like, used herein refers to any form of information, files, and/or data such as, but not limited to, instructional information; directions; and promotions, to name a few; in the form of text, image, audio message, audio file, video message, video file; vibration; monophonic and/or a polyphonic sounds and/or voice-overs; and audio-visual file types, to name a few; video codec file formats used to encode video data; video codec file formats used to compress audio data; any further separation and/or combination thereof; and/or other form of information, file, and/or data capable of being displayed, actuated, generated, communicated, and/or used on location system 100, mobile recipient device 102, website provider system 104, and/or user electronic device 106. Further, the decibel level and/or brightness level associated with comments can be controlled and/or modified by location system 100, mobile recipient device 102, website provider system 104, and/or user electronic device 106.

Further, the terms "spot comments", "comments information", "respective spot comment information", "respective comments information", "spot alerts", "respective spot comment information associated with spot alerts", and the like, can refer to any of a promotion content that can include, but not be limited to, advertisements, offers, and/or rewards for products and/or services that can provide information related to products and/or services, provide discounts and/or incentives to purchase products and/or services, such as a coupon, to name a few. For example, a promotion can include, but is not limited to, at least one of a jingle; an audio and/or video message related to the advertiser, the product, and/or service that can be the subject of the advertisement, offer, and/or reward; a game; a coupon; a discount on the price of a good; a discount on the price of a purchase; a free item; money, to name a few. For ease, at times the above variations are not listed and/or are only partially listed; this is in no way meant to be a limitation.

Figure 2:
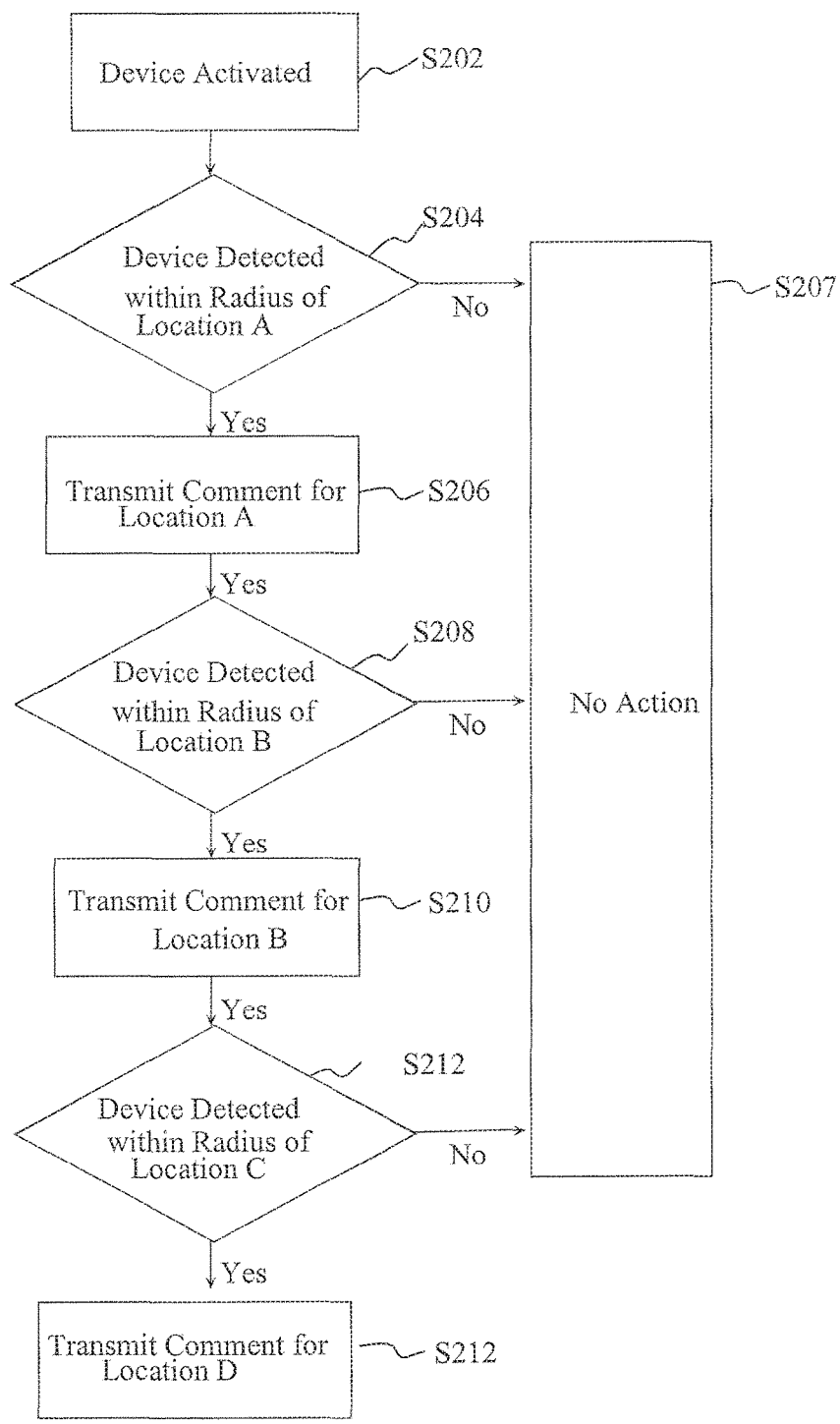
FIG. 2 is a flow chart illustrating transmission of various spot alerts and/or spot comments to un-specified recipient mobile electronic devices based on the recipient mobile electronic device's location relative to a plurality of locations, in accordance with exemplary embodiments of the present invention.

Referring to FIG. 2, in exemplary embodiments, spot comments can be transmitted to mobile recipient device 102 based on the location of mobile recipient device 102. For example, at step 202, mobile recipient device 102 that is activated, and/or on, such that its location can be detected location system 100 and/or website provider system 104 and/or located such that a spot comment can be communicated to it.

It will be understood that the location of mobile recipient device 102 and/or the terms "location detecting", "locating", "location data", "location information", "location tracking", "detection", "located", and the like, as used herein can refer to any form of location detecting, location tracking technology, and/or locating and/or detecting methods that can be used to provide a location of a mobile recipient device 102, such as, but not limited to, at least one of location information manually input by a user, such as, but not limited to entering the city, town, municipality, zip code, area code, cross streets, and/or by any other reasonable entry to determine a geographical area; Global Positions Systems (GPS); GPS accessed using Bluetooth®; GPS accessed using any reasonable form of wireless and/or non-wireless communication; WiFi™ server location data; Bluetooth® based location data; triangulation such as, but not limited to, network based triangulation, WiFi™ server information based triangulation, Bluetooth® server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; and/or any other reasonable way to determine location. For ease, at times the above variations are not listed and/or are only partially listed; this is in no way meant to be a limitation.

In exemplary embodiments, location system 100, mobile recipient device 102, website provider system 104, and/or user electronic device 106 can be operably connected to the one or more electronic databases, affiliated with processor readable memory, wherein the processor readable memory stores processor readable instructions that, when executed, cause location system 100, mobile recipient device 102, website provider system 104, and/or user electronic device 106 to perform the steps to determine the locations. For example, mobile recipient device 102 can include processor readable instructions that, when executed, cause mobile recipient device 102 to perform the steps of periodically identifying the location of mobile recipient device 102 using any of the techniques disclosed and/or any other reasonable techniques. Further, mobile recipient device 102 can then allow its location to be detected. For another example, location system 100 can include processor readable instructions that, when executed, cause location system 100 to perform the steps of periodically identifying the location of mobile recipient device 102 using any of the techniques disclosed and/or any other reasonable techniques.

In exemplary embodiments, at step 204, if mobile recipient device 102's location can be detected and/or located within, for example, a range and/or radius of a first location, for example, location "A" then a spot comment affiliated with that first location, spot comment "A", can be transmitted to mobile recipient device 102 from location system 100 and/or website provider system 104, at step 206. Of course, if mobile recipient device 102 is not detected and/or transmitted then no action can occur, at step 207.

Figure 3:
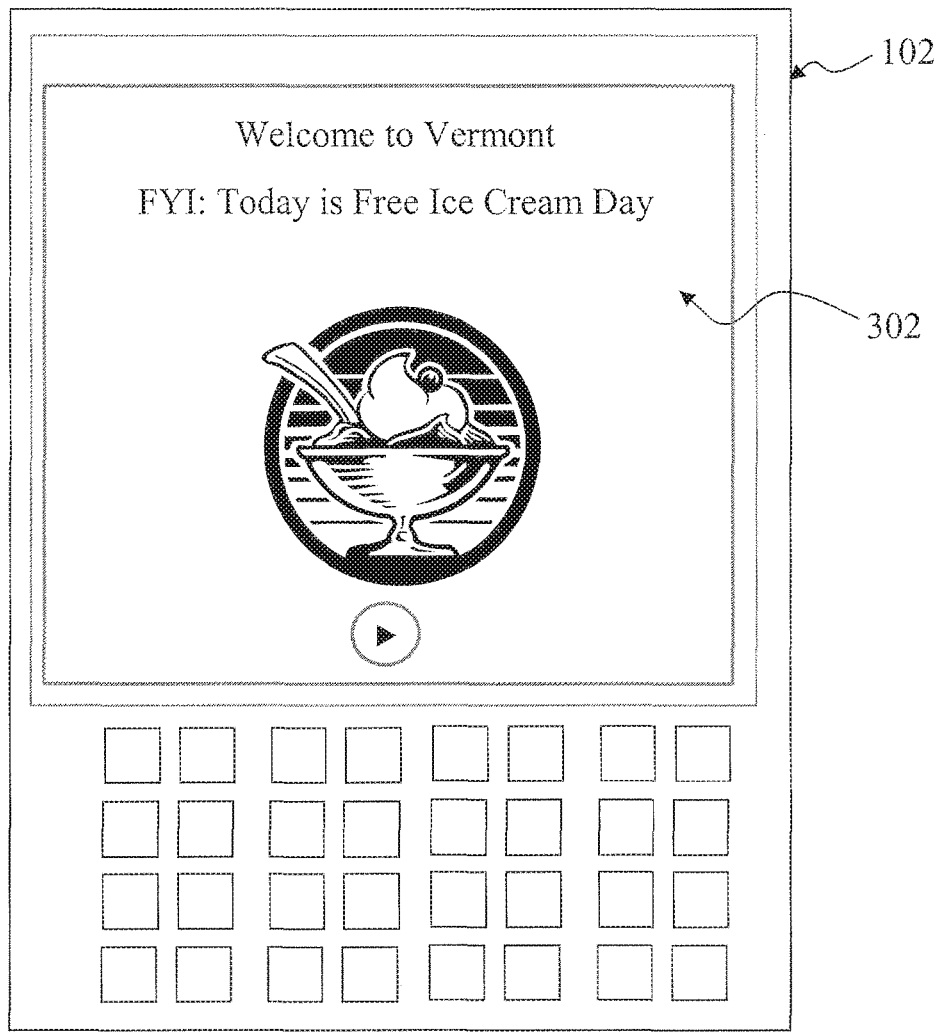
FIGS. 3-5 are exemplary spot alerts and/or spot comments illustratively depicted on recipient mobile electronic devices, in accordance with exemplary embodiments of the present invention.

By way of example, referring to FIG. 3, while traveling by car and/or train, mobile recipient device 102 could enter a predetermined distance (e.g., one quarter mile from the Vermont border), and be detected and/or located by location system 100 and/or website provider system 104 such that a spot comment 302 can be transmitted to mobile recipient device 102. In exemplary embodiments, to determine whether or not spot comment 302 should be transmitted to mobile recipient device 102, information such as, but not limited to, mobile recipient device information, mobile recipient device location information, mobile recipient device identification information, location information, spot alert data information, respective spot location information, respective spot range information, respective spot comment information, and respective spot approved recipient information, to name a few, can be analyzed, using at least one processor.

Referring back to FIG. 2, in exemplary embodiments, at step 208, if mobile recipient device 102 is detected and/or located within, for example, a range and/or radius of a second location, for example, location "B" then a spot comment affiliated with that second location, spot comment "B", can be transmitted to mobile recipient device 102 from location system 100 and/or website provider system 104, at step 210. Of course, if mobile recipient device 102 is not detected and/or transmitted then no action can occur, at step 207.

Figure 4:
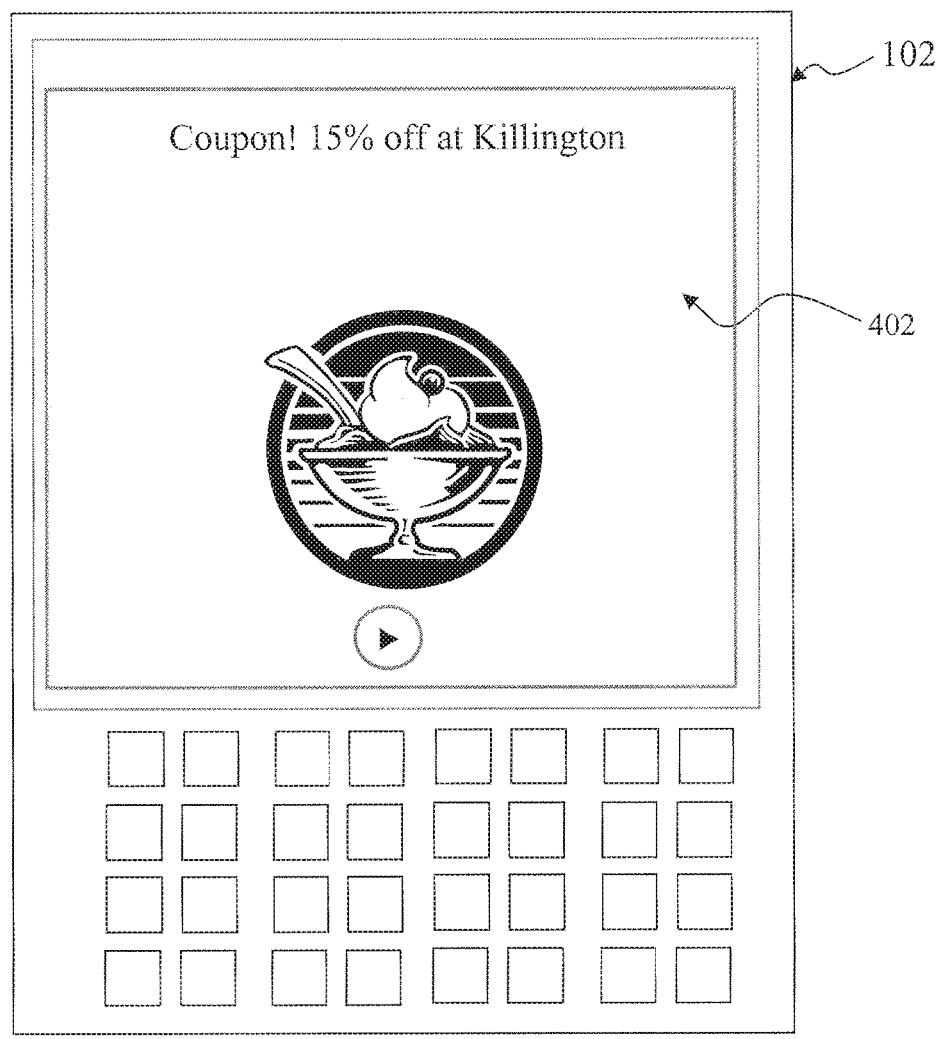

Following the above example, referring to FIG. 4, while continuing to travel by car and/or train, mobile recipient device 102 could enter a predetermined distance (e.g., one quarter mile from the Killington Ski Resort), and be detected and/or located by location system 100 and/or website provider system 104 such that a spot comment 402 can be transmitted to mobile recipient device 102. In exemplary embodiments, to determine whether or not spot comment 402 should be transmitted to mobile recipient device 102, information such as, but not limited to, mobile recipient device information, mobile recipient device location information, mobile recipient device identification information, location information, spot alert data information, respective spot location information, respective spot range information, respective spot comment information, and respective spot approved recipient information, to name a few, can be analyzed, using at least one processor.

Referring back to FIG. 2, in exemplary embodiments, at step 212, if mobile recipient device 102 is detected and/or located within, for example, a range and/or radius of a third location, for example, location "C" then a spot comment affiliated with that third location, spot comment "C", can be transmitted to mobile recipient device 102 from location system 100 and/or website provider system 104, at step 214. Of course, if mobile recipient device 102 is not detected and/or transmitted then no action can occur, at step 207.

Figure 5:
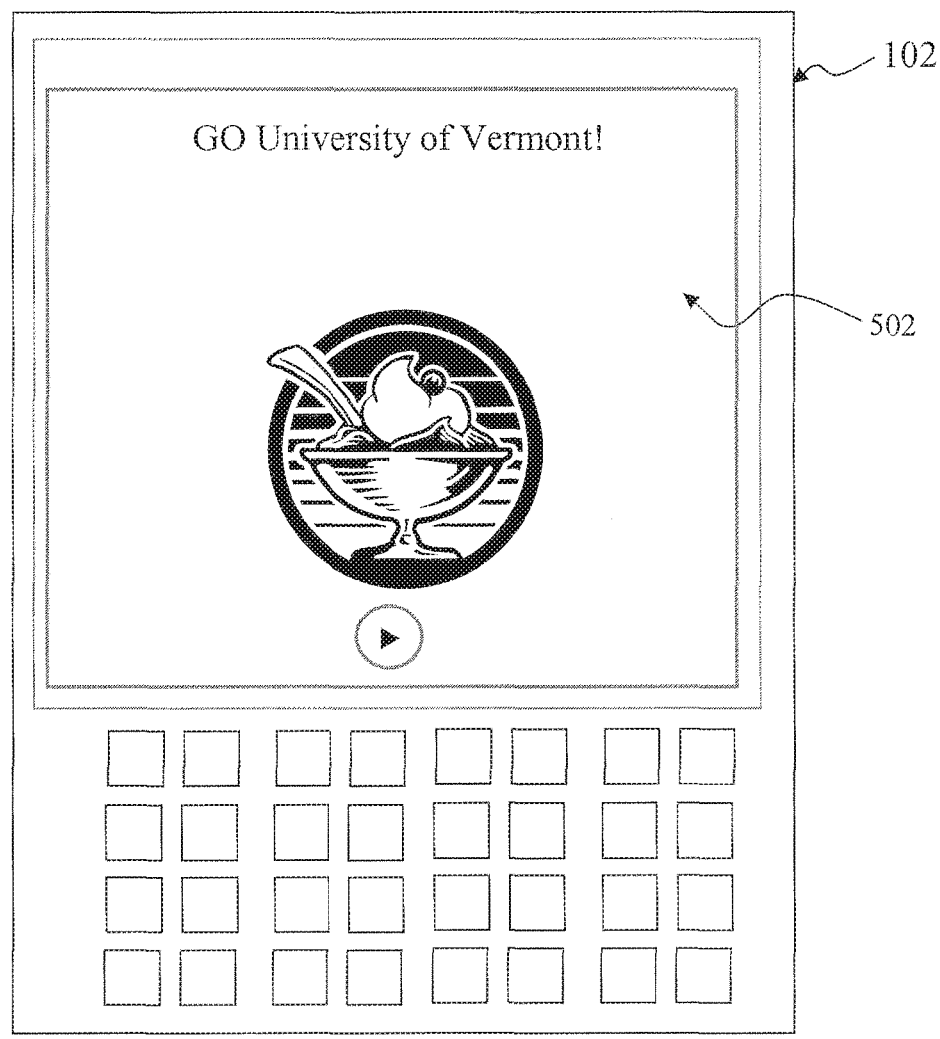

Still following the above example, referring to FIG. 5, while continuing to travel by car and/or train, mobile recipient device 102 could enter a predetermined distance (e.g., one mile from the University of Vermont), and be detected and/or located by location system 100 and/or website provider system 104 such that a spot comment 502 can be transmitted to mobile recipient device 102. In exemplary embodiments, to determine whether or not spot comment 502 should be transmitted to mobile recipient device 102, information such as, but not limited to, mobile recipient device information, mobile recipient device location information, mobile recipient device identification information, location information, spot alert data information, respective spot location information, respective spot range information, respective spot comment information, and respective spot approved recipient information, to name a few, can be analyzed, using at least one processor.

It will be understood that any of the steps described can be rearranged, separated, and/or combined without deviated from the scope of the invention. For ease, steps are, at times, presented sequentially. This is merely for ease and is in no way meant to be a limitation. Further, any number of locations can include any number of spot comments. For ease, at times, only a few locations and/or a single spot comment are described. This is merely for ease and is in no way meant to be a limitation.

Further, in exemplary embodiments, mobile recipient device 102 can transmit location information automatically to location system 100 and/or website provider system 104 and/or transmit location information manually, for example, by user input such that it is detected and/or located by location system 100 and/or website provider system 104. For ease, mobile recipient device 102 is, at times, described as being automatically detected and/or located by location system 100 and/or website provider system 104. This is merely for ease and is in no way meant to be a limitation.

Figure 6:
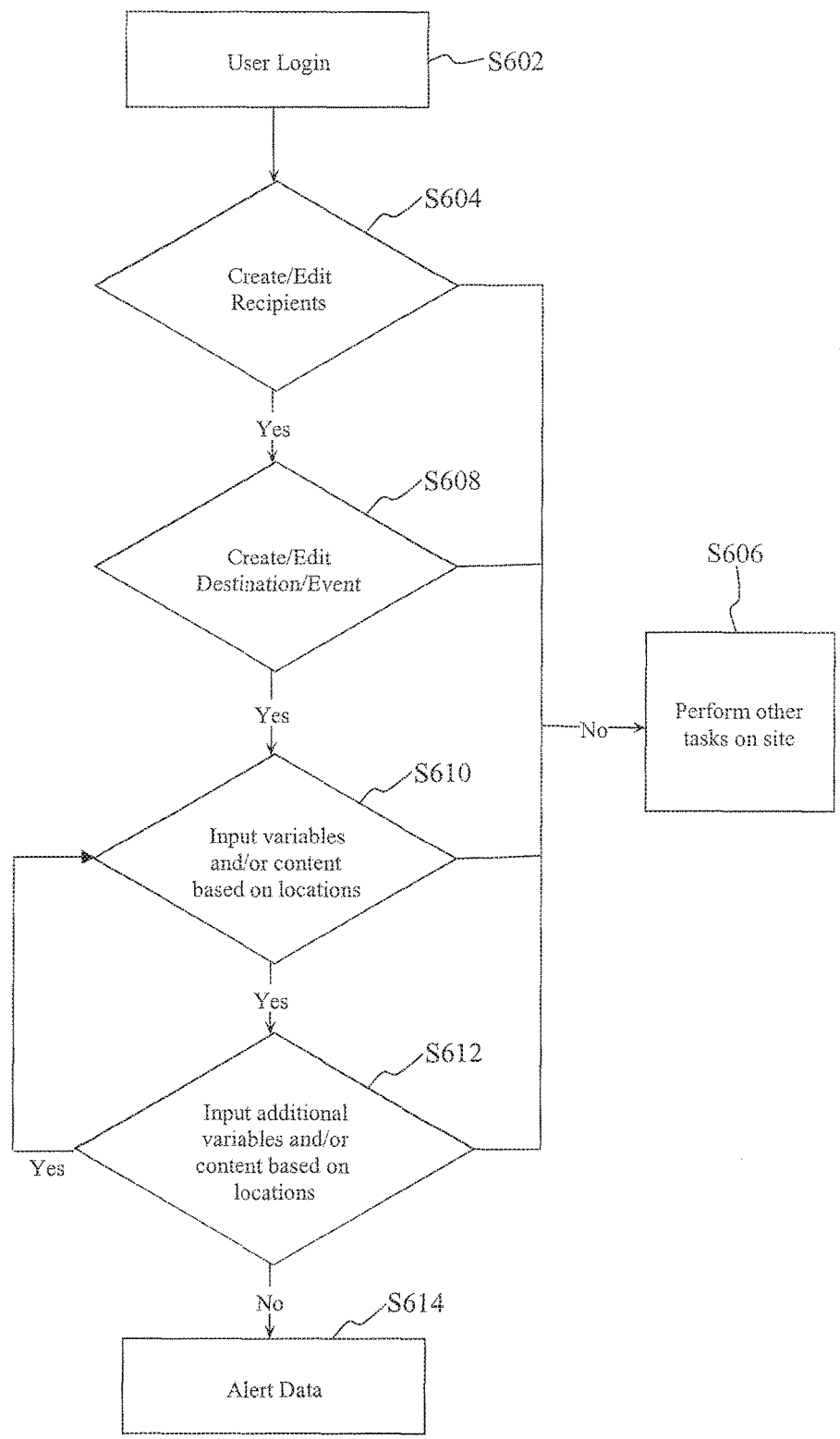
FIG. 6 is a flow chart illustrating exemplary participants created and/or edited variables for transmission of various spot alerts and/or spot comments to recipient mobile electronic devices based on the recipient mobile electronic device's location relative to a plurality locations, in accordance with exemplary embodiments of the present invention.

Referring to FIG. 6, in exemplary embodiments, the user can select to create and/or edit information with respect to any number of locations, activities, and events, to name a few, and share that information with approved recipients and/or respective spot approved recipient information. Further, in exemplary embodiments, a user can create and/or edit variables affiliated with alert data, such as, but not limited to, any number of approved recipients, respective spot approved recipient information, respective spot location information, respective spot range information, respective spot comment information, and/or any other reasonable variables such that spot comments can be transmitted to mobile recipient device 102 from location system 100 and/or website provider system 104 based on the location of mobile recipient device 102.

It will be understood that any of the steps described can be rearranged, separated, and/or combined without deviated from the scope of the invention. For ease, steps are, at times, presented sequentially. This is merely for ease and is in no way meant to be a limitation. Further, any number of locations can include any number of spot comments. For ease, at times, only a few locations and/or a single spot comment are described. This is merely for ease and is in no way meant to be a limitation.

For example, at step 602, a user electronic device can login to a website, such as a social networking interface and/or website, and, at step 604, create and/or edit approved recipients, and/or respective spot approved recipient information for any number of location, activity, and/or event, to name a few, at step 608. Of course, if the user electronic device does not desire to create and/or edit approved recipients and/or respective spot approved recipient information then they can perform other tasks on the site, at step 606.

Figure 7:
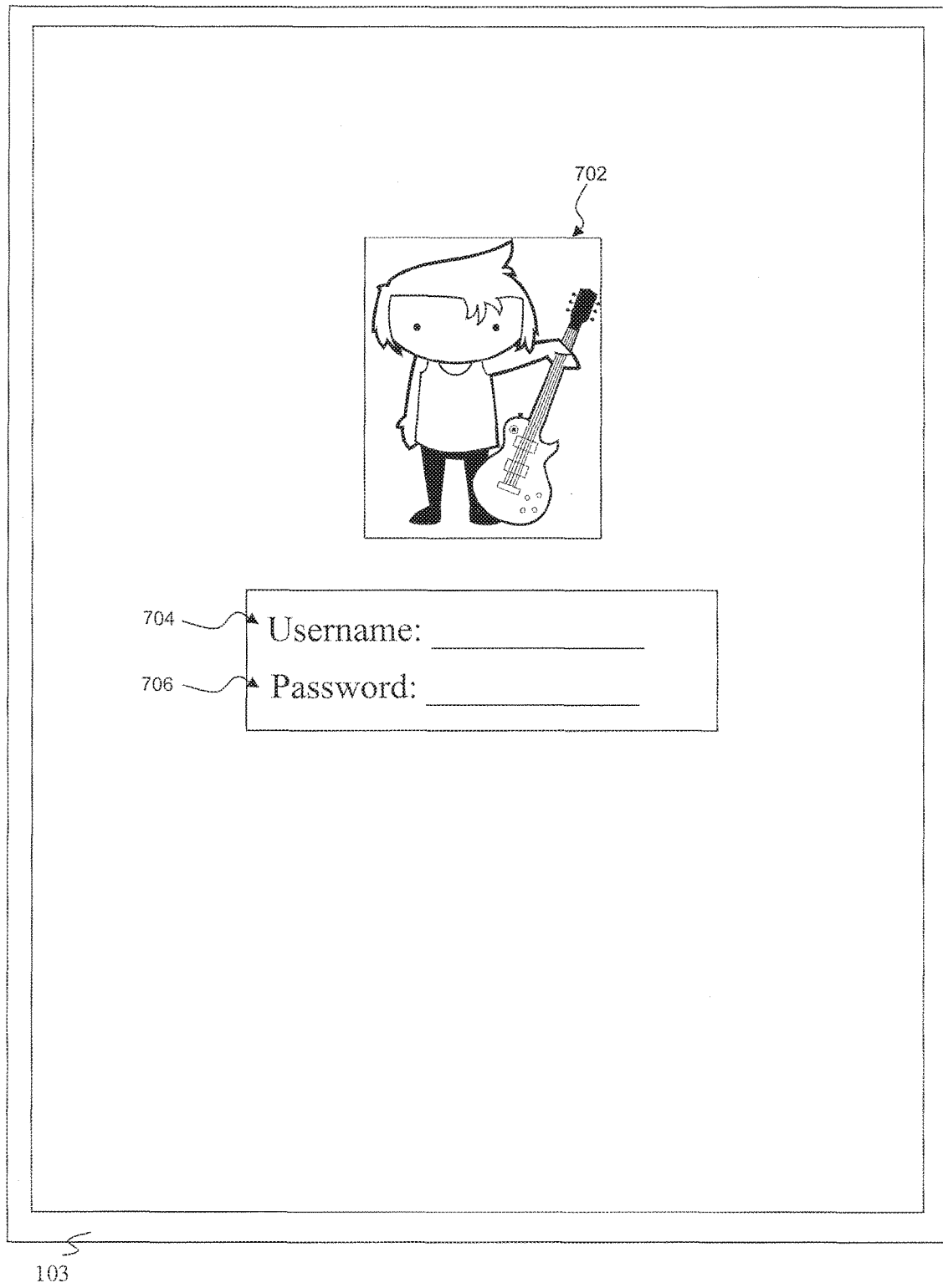
FIGS. 7-11 are exemplary screenshots illustratively depicted on user electronic devices, in accordance with exemplary embodiments of the present invention.

By way of example, referring to FIG. 7, a user electronic device 702 can login at a user login screen, displayed in graphical user interface 103, by inputting information such as, but not limited to, their username 704, password 706, biometric information (not shown), and/or any other form of verification. In this example, to login to an account, such as a social networking interface and/or website account, user electronic device 702 can be required to enter their username 704 and password 706.

Further, when creating an account, the user can have the option of using a social networking interface and/or website, for example, a set of application programming interfaces (API) from a social networking interface and/or website provider, such as Facebook Connect, to log in, and/or to input information. The information can be, but not limited to an e-mail address, a password, first name and/or last name, and/or any desired user name, and/or any other information input.

Figure 8:
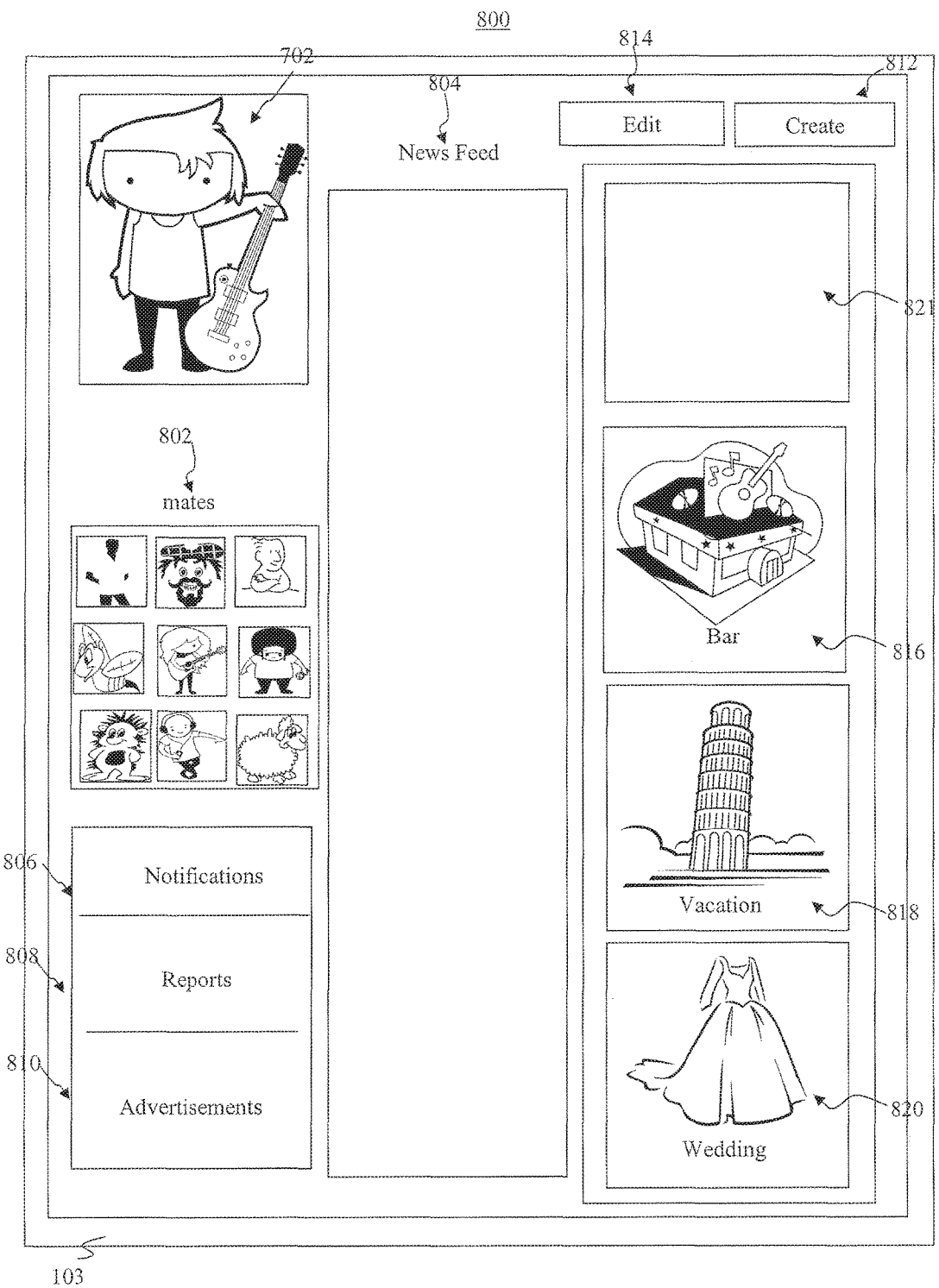

Following the above example, referring to FIG. 8A-8B after logging in a user electronic device 702 can view homepage 800, displayed in graphical user interface 103, which can include at least some pre-populated information such as, but not limited to, mates 802, news feeds 804, notification information 806, report information 808, and advertisements 810, to name a few. Further, in exemplary embodiments, the user can select to create 812 and/or edit 814 information with respect to any location 816, activity 818, and event 820, to name a few, and share that information with approved recipients and/or respective spot approved recipient information.

After logging in users associated with user electronic devices and/or recipients associated with recipient mobile electronic devices can request mates, request approved recipients and/or respective spot approved recipient information, view approved recipients and/or respective spot approved recipient information, create locations, search for locations, as well as create, edit, and/or modify any information such as, but not limited to, spot comments, approved recipients, respective spot approved recipient information, respective spot location information, respective spot range information, respective spot comment information, restrict the transmission of aggregated spot comments and/or information associated with the aggregated exchange of spot comments, location information, distances and/or ranges from that location, content of the information, spot alert data information, recipient mobile electronic device information, and/or any other information.

In exemplary embodiments, location searches can be performed based on user input, keyword searches, category searches, user searchers, recipient searches, searches using processor readable memory that can be accessed and/or processed by a processor of any of mobile recipient device 102 from location system 100 and/or website provider system 104, any combination and/or separation thereof, and/or any other reasonable search.

By way of example, referring to FIG. 8A, by selecting to create 812 the user can create information for a location 821 (e.g., a ski house) that they share that information with approved recipients and/or respective spot approved recipient information and/or input variables affiliated with alert data, such as, but not limited to, any number of approved recipients, respective spot approved recipient information, respective spot location information, respective spot range information, respective spot comment information, and/or any other reasonable variables such that spot comments can be transmitted to mobile recipient device 102 from location system 100 and/or website provider system 104 based on the location of mobile recipient device 102.

By way of another example, referring to FIG. 8B, by selecting to edit 814 the user can edit information for a location 821 (e.g., a ski house) that they share that information with approved recipients and/or respective spot approved recipient information and/or input variables affiliated with alert data, such as, but not limited to, any number of approved recipients, respective spot approved recipient information, respective spot location information, respective spot range information, respective spot comment information, and/or any other reasonable variables such that spot comments can be transmitted to mobile recipient device 102 from location system 100 and/or website provider system 104 based on the location of mobile recipient device 102.

In exemplary embodiments, approved recipients and/or respective spot approved recipient information can include any number and/or grouping of approved recipients and/or respective spot approved recipient information for any location, activity, and event, to name a few. Further, locations, and information, associated with locations, can be categorized by, for example, food, entertainment, shopping, drinking establishments, recommended locations, and/or by any other form of category.

It will be understood that a user can create and/or edit approved recipients and/or respective spot approved recipient information using a program, website, algorithm, application programming interfaces, and/or any other form of interface affiliated with any of location system 100, mobile recipient device 102, website provider system 104, and/or user electronic device 106. For ease, an example of a user creating and/or editing approved recipients and/or respective spot approved recipient information is described, at times, in terms of a website and/or social networking interface and/or website. This is merely for ease and is in no way meant to be a limitation.

Referring back to FIG. 6, in exemplary embodiments, at step 610 through 612, a user can input variables and/or content for any location, activity, and event, to name a few, such that alert data can be generated, at step 614. In exemplary embodiments, this alert data can be used to analyzed, for example, to determine spot comments to transmit to approved recipients and/or respective spot approved recipient information for any location, activity, and event, to name a few.

Figure 9:
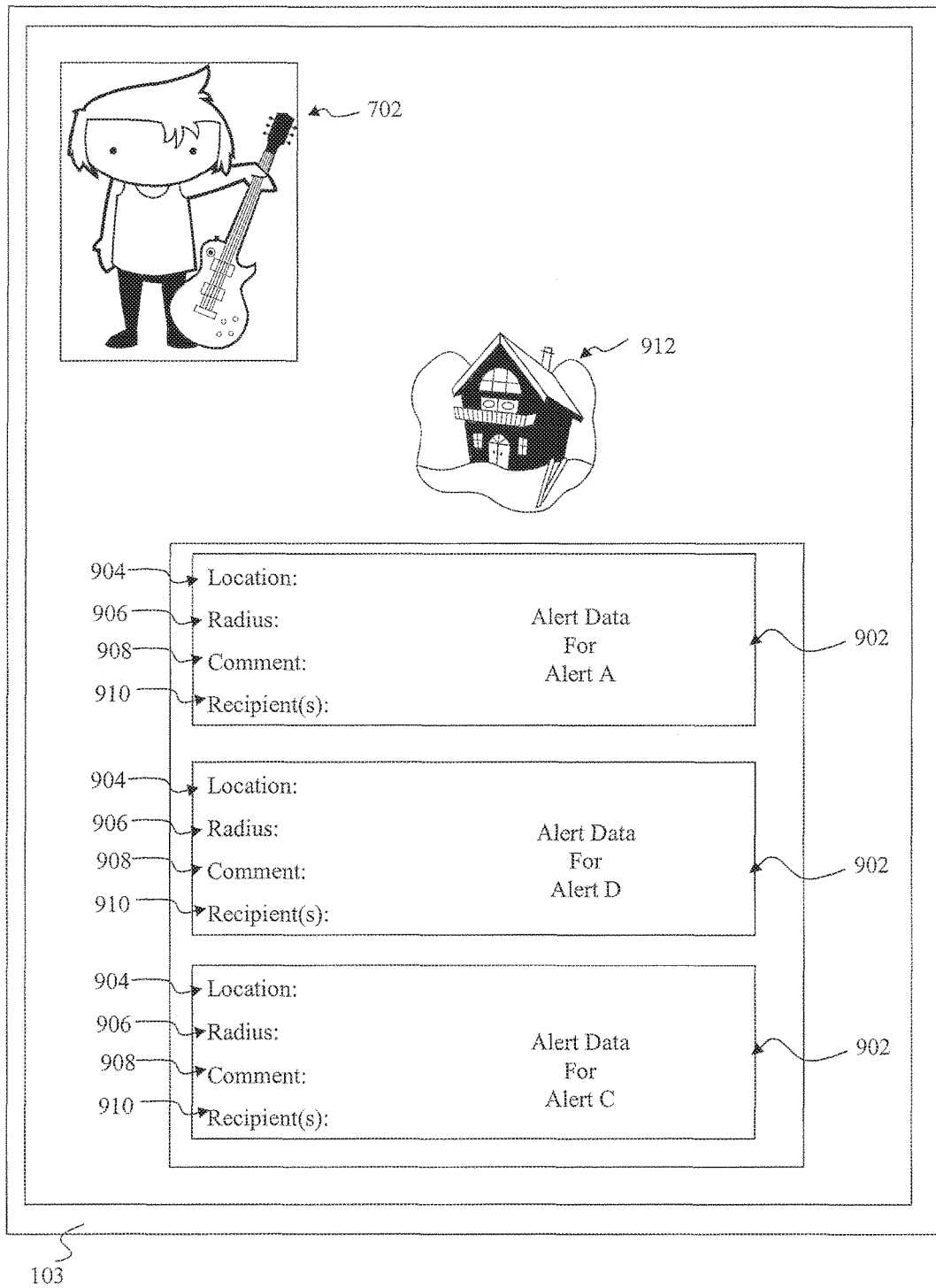

Referring to FIG. 9, by way of example, using user electronic device 702 a user can edit variables that can be used with spot alert data information 902 such as, but not limited to, respective spot location information 904, respective spot range information 906, respective spot comment information 908, approved recipients and/or respective spot approved recipient information 910, and/or any other variables that can be used with alert data. Further, in exemplary embodiments, at least some of edit variables that can be used with spot alert data information 902 can be automatically generated, for example, using user electronic device 702. For example, using a location can be automatically generated a location system associated with user electronic device 702.

Figure 10:
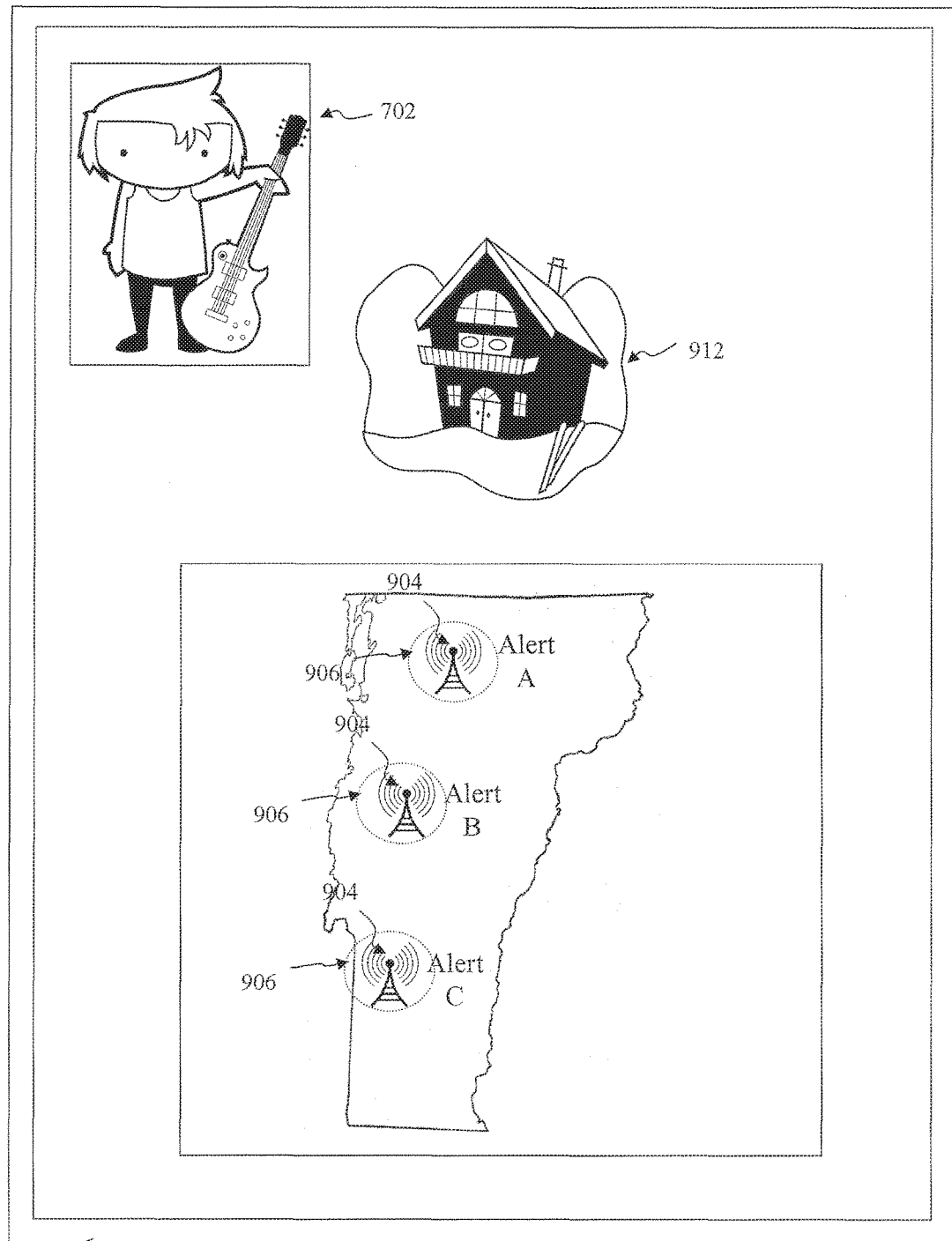

By way of example, referring to FIG. 10, utilizing the alert data when various approved recipients and/or respective spot approved recipient information 910 are within range 906 of location 904 spot comment 908, associated with respective spot alert, can be transmitted to the recipient mobile electronic device affiliated with approved recipients and/or respective spot approved recipient information 910 and/or user electronic device 702.

Figure 11:
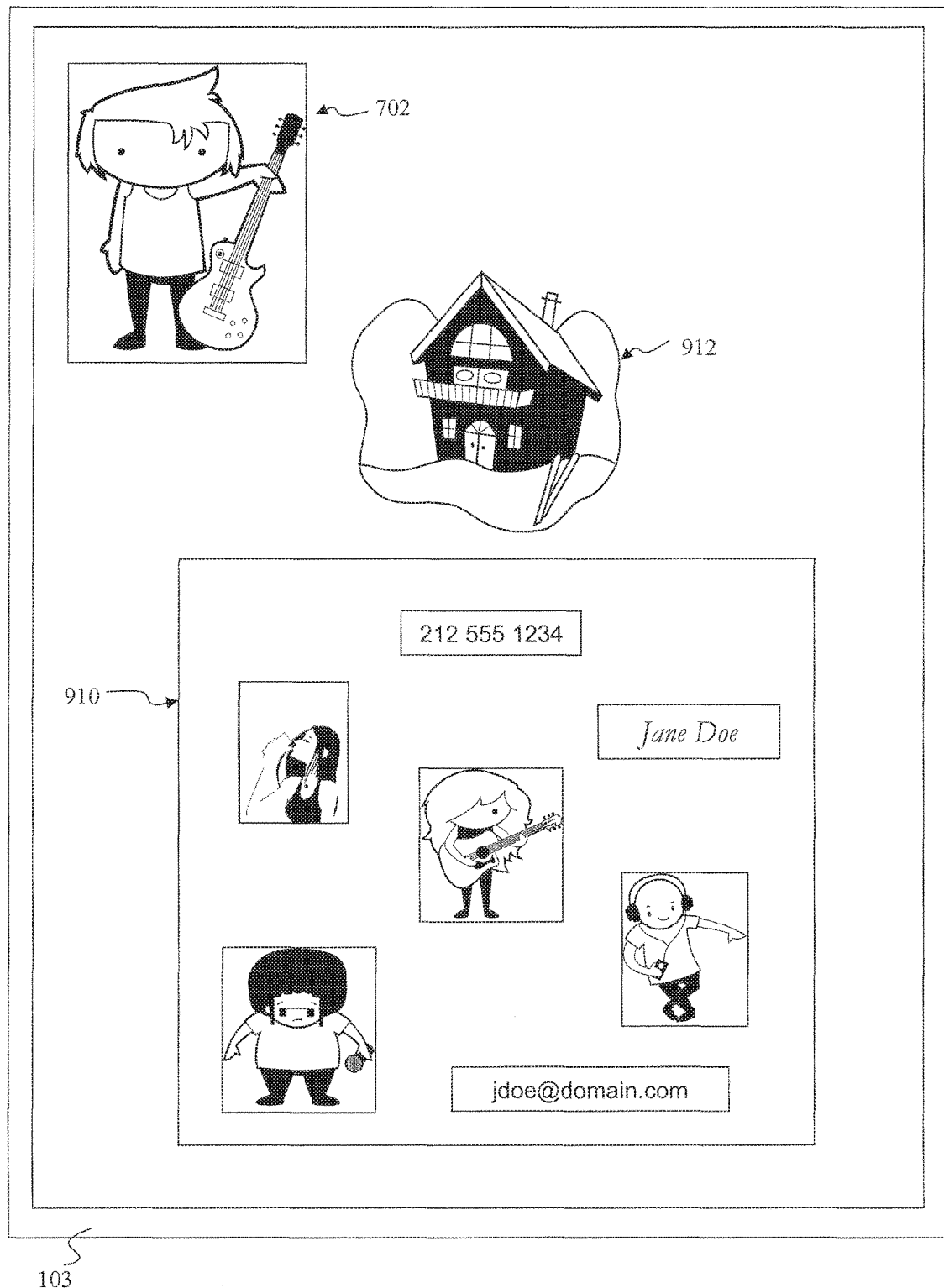

Further, referring to FIG. 11, approved recipients and/or respective spot approved recipient information can include any number of individuals, groups, contact information such as, but not limited to, phone numbers, email address, residency address, and name, to name a few.

In exemplary embodiments, users can select and add recipients and/or approved recipients from their existing e-mail and/or social networking interface and/or website accounts and/or can share locations, and affiliated information, with approved recipients and/or respective spot approved recipient information. Further, users, recipient, and/or approved recipients, can be restricted to only be able to view see their locations, and affiliated information. Further, users, recipient, and/or approved recipients can be able to select which users, recipient, and/or approved recipients have access to specific locations, and affiliated information, and/or users can choose to not share their locations, and affiliated information, with any users, recipient, and/or approved recipients. Further, in exemplary embodiments, only selected users, recipient, and/or approved recipients can read and write about locations, and affiliated information, and/or only selected recipients can read and write about additional information.

In exemplary embodiments, users can request recipients using information from any source, such as, but not limited to social networking interface and/or website, e-mail accounts, and manually entering in information, to name a few. Further, users can request recipients via e-mail invitation, e-mail invitations which can include a link to the website, sending an algorithm and/or QR code, and/or users can request recipients using any other technique.

Figure 12:
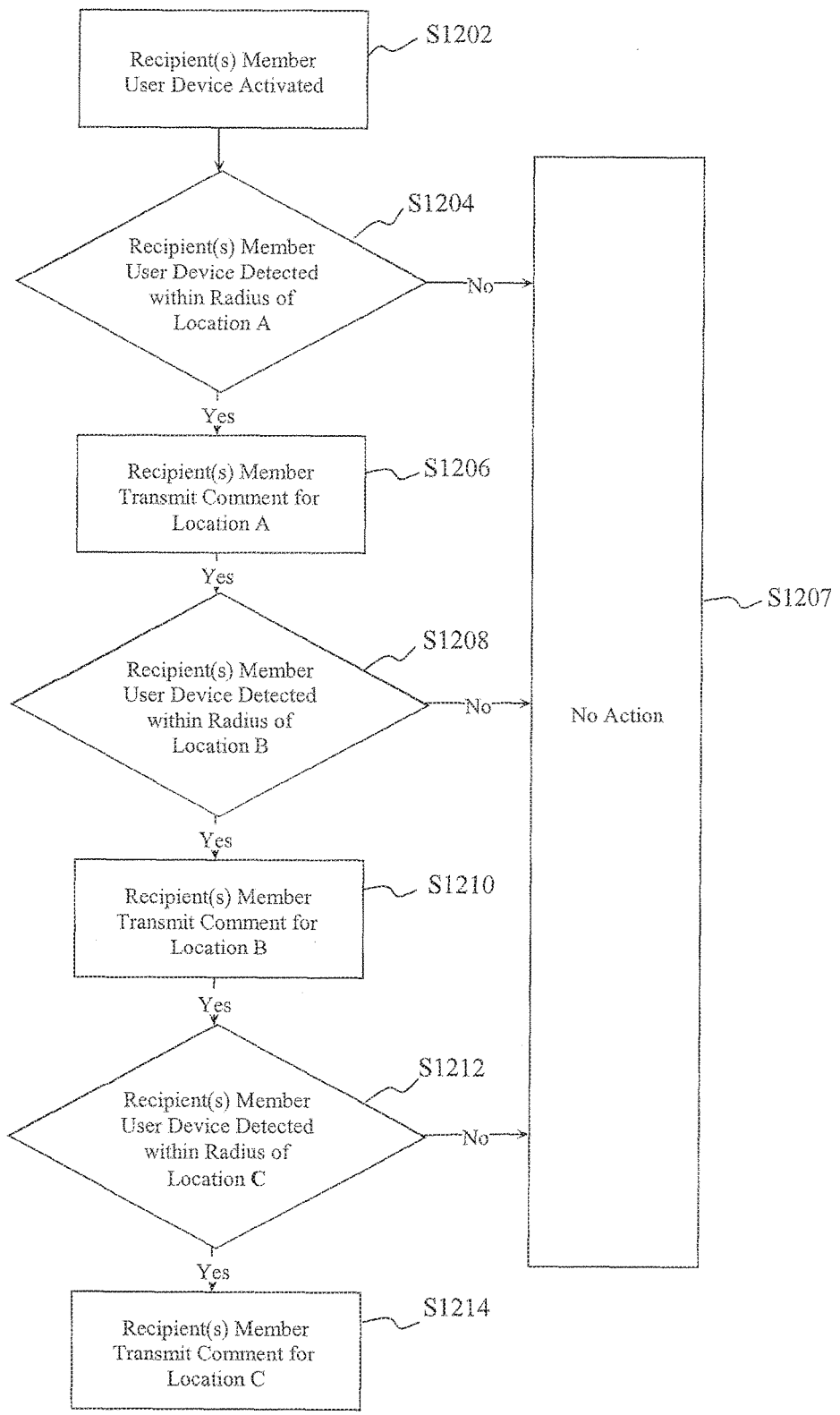
FIG. 12 is a flow chart illustrating transmission of various spot alerts and/or spot comments to specified recipient mobile electronic devices based on the recipient mobile electronic device's location relative to a plurality locations, in accordance with exemplary embodiments of the present invention.

Referring to FIG. 12, in exemplary embodiments, spot comments can be transmitted to mobile recipient device 102 from location system 100 and/or website provider system 104 based on the location of mobile recipient device 102 and user input variables. For example, at step 1202, mobile recipient device 102 affiliated with approved recipients and/or respective spot approved recipient information, as defined by the user, such that when activated and/or on, its location can be detected and/or located and a spot comment communicated to it.

In exemplary embodiments, at step 1204, if mobile recipient device 102 affiliated with approved recipients and/or respective spot approved recipient information's location is detected and/or located within, for example, a range and/or radius of a first location, for example, location "A" then a spot comment affiliated with that first location, spot comment "A", can be transmitted to mobile recipient device 102 from location system 100 and/or website provider system 104, at step 1206. Of course, if mobile recipient device 102 affiliated with approved recipients and/or respective spot approved recipient information is not detected and/or transmitted then no action can occur, at step 1207.

Figure 13:
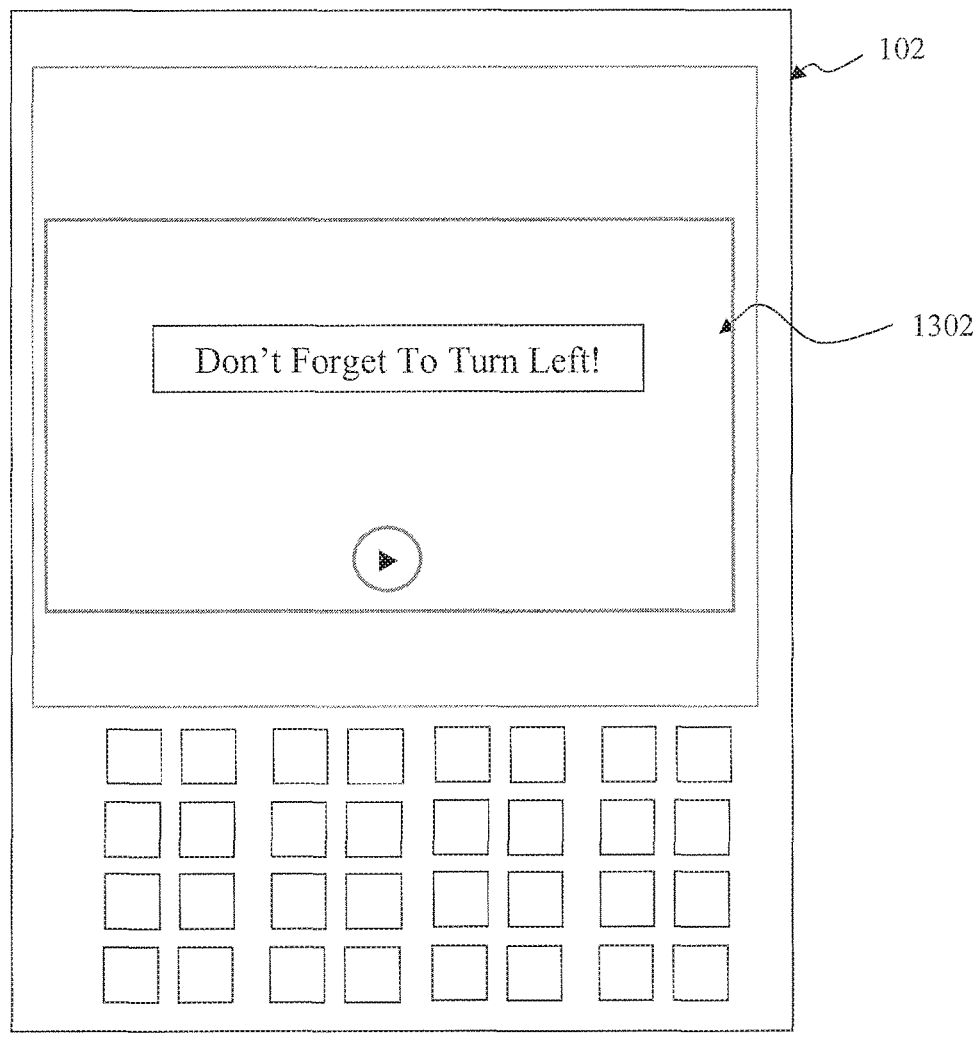
FIGS. 13-15 are exemplary spot alerts and/or spot comments illustratively depicted on recipient mobile electronic devices, in accordance with exemplary embodiments of the present invention.

By way of example, referring to FIG. 13, while traveling by car and/or train, mobile recipient device 102 affiliated with approved recipients and/or respective spot approved recipient information could enter a particular predetermined distance from an important location (e.g., at an important left turn), and be detected and/or located by location system 100 and/or website provider system 104 such that a spot comment 1302 can be transmitted to mobile recipient device 102. In exemplary embodiments, to determine whether or not spot comment 1302 should be transmission to mobile recipient device 102, information such as, but not limited to, recipient mobile electronic device location information, respective spot location information, respective spot range information, respective spot comment information, and respective spot approved recipient information, to name a few, can be analyzed, using at least one processor.

Referring back to FIG. 12, in exemplary embodiments, at step 1208, if mobile recipient device 102 affiliated with approved recipients and/or respective spot approved recipient information is detected and/or located within, for example, a range and/or radius of a second location, for example, location "B" then a spot comment affiliated with that second location, spot comment "B", can be transmitted to mobile recipient device 102 from location system 100 and/or website provider system 104, at step 1210. Of course, if mobile recipient device 102 is not detected and/or transmitted then no action can occur, at step 1207.

Figure 14:
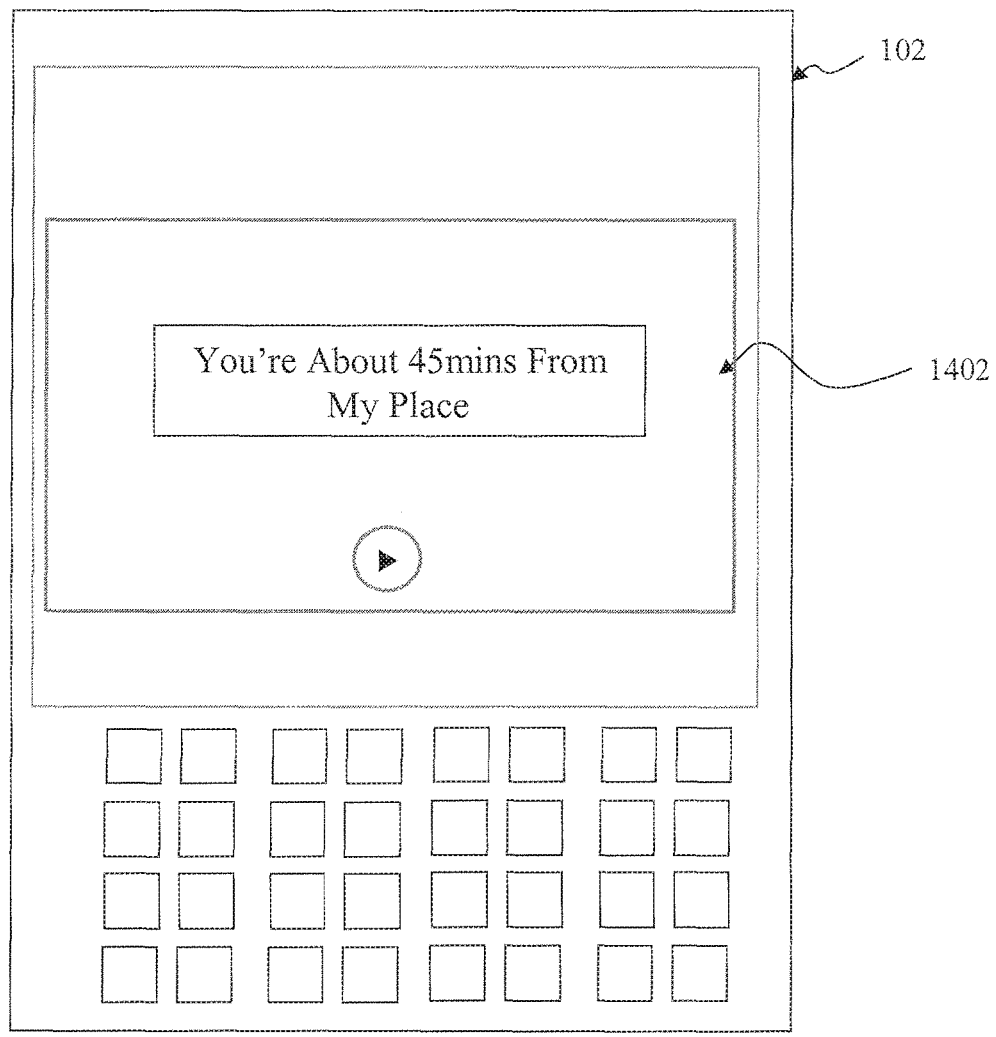

Following the above example, referring to FIG. 14, while continuing to travel by car and/or train, mobile recipient device 102 affiliated with approved recipients and/or respective spot approved recipient information could enter a particular predetermined distance (e.g., about 45 mins and/or 30 miles from the Ski House in Vermont), and be detected and/or located by location system 100 and/or website provider system 104 such that a spot comment 402 can be transmitted to mobile recipient device 102. In exemplary embodiments, to determine whether or not spot comment 1402 should be transmission to mobile recipient device 102, information such as, but not limited to, recipient mobile electronic device location information, respective spot location information, respective spot range information, respective spot comment information, and respective spot approved recipient information, to name a few, can be analyzed, using at least one processor.

Referring back to FIG. 12, in exemplary embodiments, at step 1212, if mobile recipient device 102 affiliated with approved recipients and/or respective spot approved recipient information is detected and/or located within, for example, a range and/or radius of a third location, for example, location "C" then a spot comment affiliated with that third location, spot comment "C", can be transmitted to mobile recipient device 102 from location system 100 and/or website provider system 104, at step 1214. Of course, if mobile recipient device 102 is not detected and/or transmitted then no action can occur, at step 1207.

Figure 15:
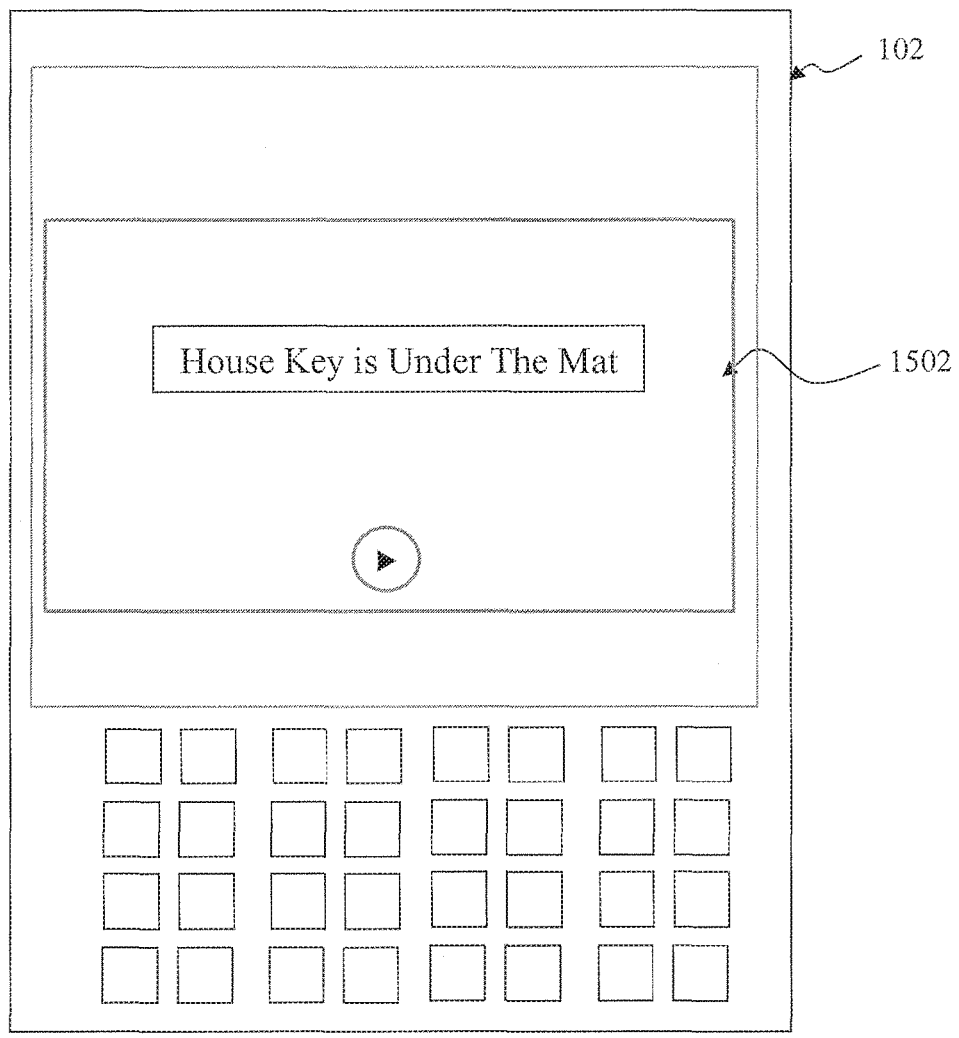

Still following the above example, referring to FIG. 15, while continuing to travel by car and/or train, mobile recipient device 102 could enter a particular predetermined distance (e.g., within a few feet of the ski house), and be detected and/or located by location system 100 and/or website provider system 104 such that a spot comment 1502 can be transmitted to mobile recipient device 102. In exemplary embodiments, to determine whether or not spot comment 1502 should be transmission to mobile recipient device 102, information such as, but not limited to, recipient mobile electronic device location information, respective spot location information, respective spot range information, respective spot comment information, and respective spot approved recipient information, to name a few, can be analyzed, using at least one processor.

In exemplary embodiments, the user of mobile recipient device 102 can also create and/or edit information with respect to any number of locations, activities, and events, to name a few, and share that information with approved recipients and/or respective spot approved recipient information. That is, alerts can be created by the user of mobile recipient device 102

Further, in exemplary embodiments, the user of mobile recipient device 102 can create and/or edit variables affiliated with alert data, such as, but not limited to, any number of approved recipients, respective spot approved recipient information, respective spot location information, respective spot range information, respective spot comment information, and/or any other reasonable variables such that spot comments can be transmitted to mobile recipient device 102 and/or user electronic device 106 from location system 100 and/or website provider system 104.

Figure 16:
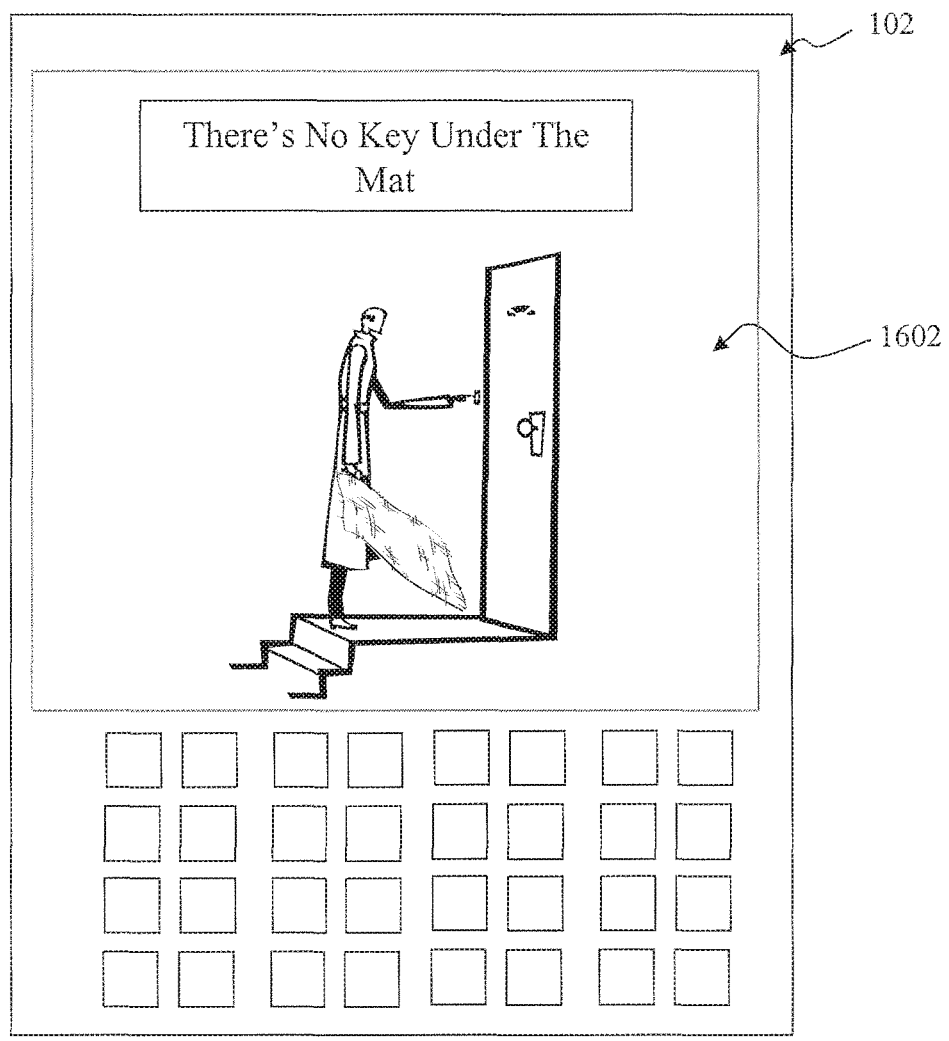
FIGS. 16-20 are exemplary additional spot alerts and/or spot comments illustratively depicted on recipient mobile electronic devices and/or user electronic devices, in accordance with exemplary embodiments of the present invention.
Figure 17:
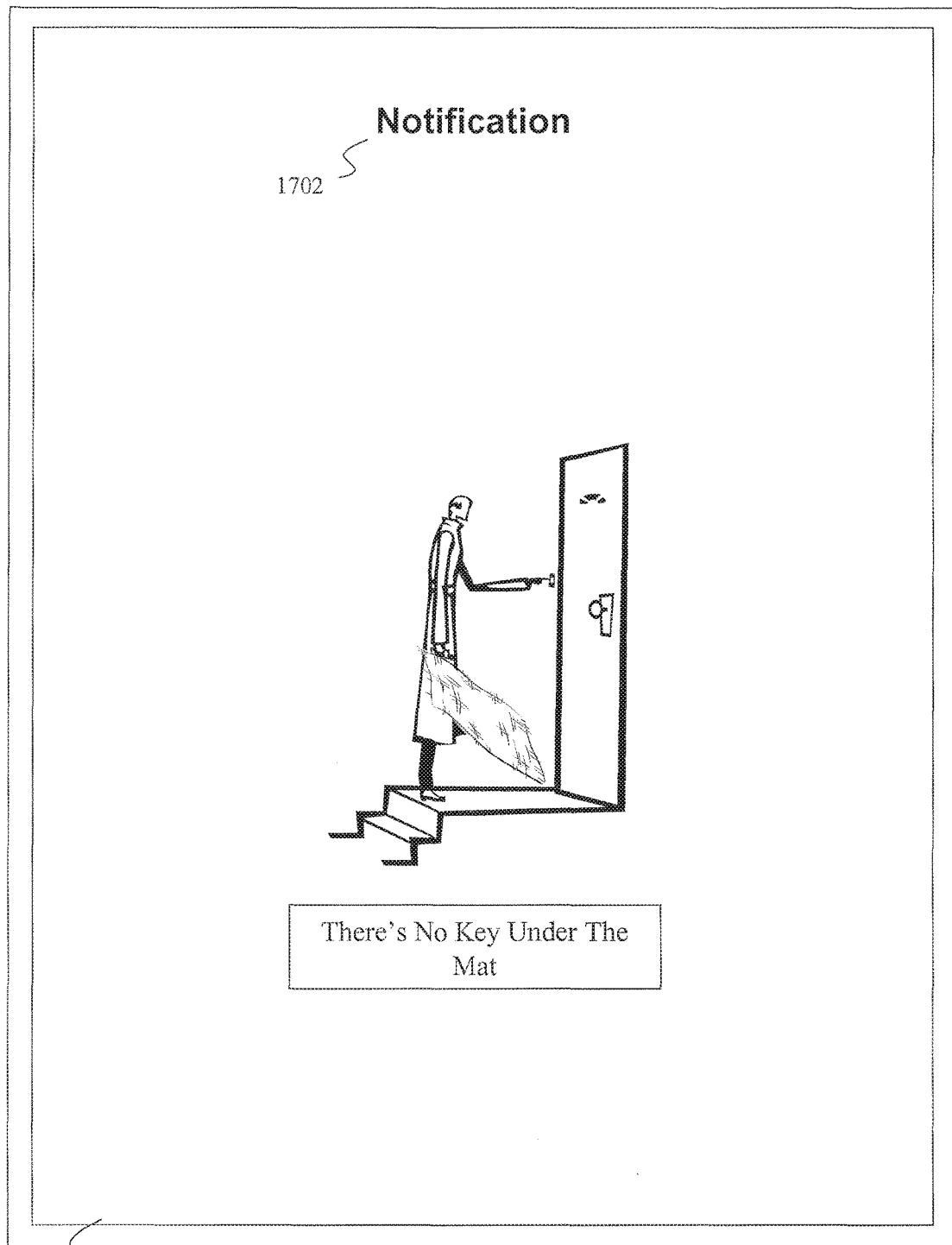

By way of example, following the above example, referring to FIG. 16 the user of mobile recipient device 102 can communicate a spot comment to the original creator of the a spot comments by communicating from mobile recipient device 102 information and, referring to FIG. 17, the original creator of the a spot comments can receive a notification 1702, for example, on user electronic device 106. The user of mobile recipient device 102 can create a spot comments using variables affiliated with alert data, such as, but not limited to, any number of approved recipients, respective spot approved recipient information, respective spot location information, respective spot range information, respective spot comment information, and/or any other reasonable variables such that additional spot comments can be created.

In exemplary embodiments, user of mobile recipient device 102 can create a spot comments using, an algorithm, for example, processor readable instructions stored in processor readable memory that can be accessed and/or processed by a processor affiliated with mobile recipient device 102.

Figure 18:
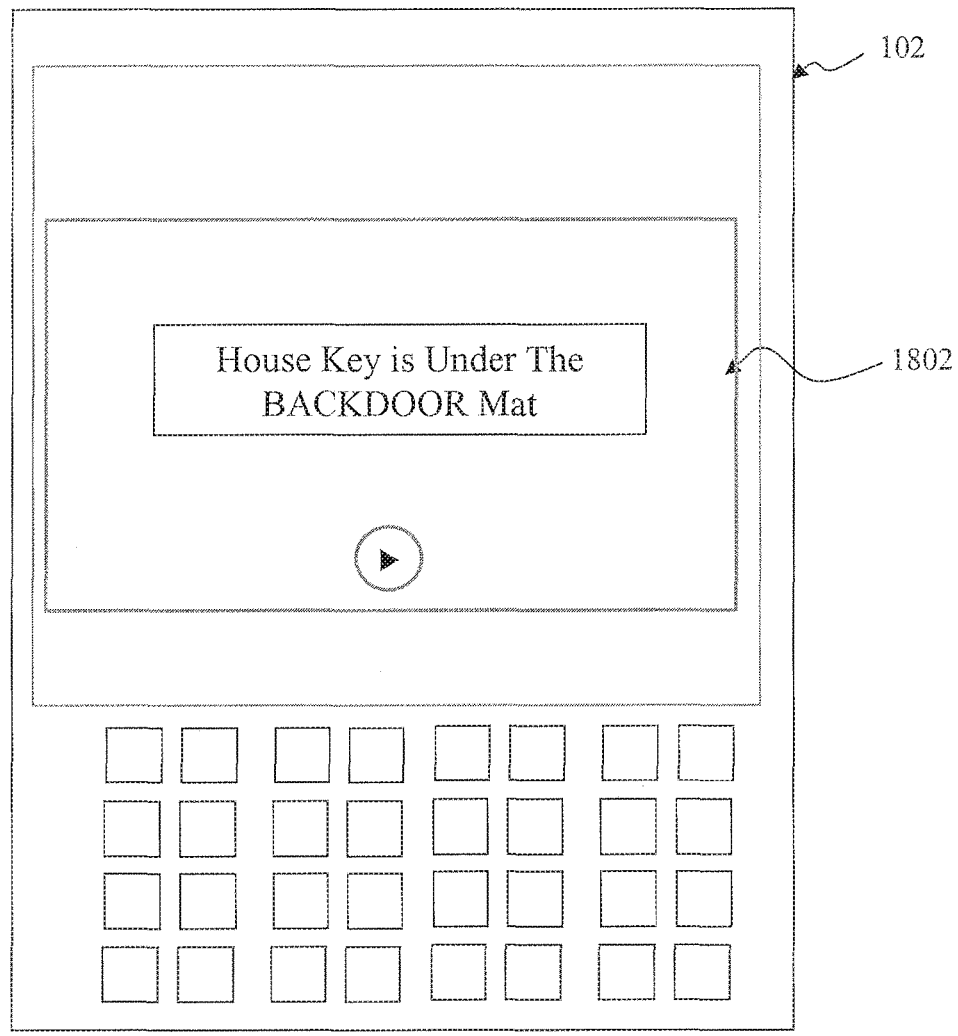

Referring to FIG. 18, in exemplary embodiments, in response to the additional spot comment communicated from mobile recipient device 102, the original creator of the spot comments can then create and/or edit variables affiliated with alert data, such as, but not limited to, any number of approved recipients, respective spot approved recipient information, respective spot location information, respective spot range information, respective spot comment information, and/or any other reasonable variables such that additional spot comments 1802 can be transmitted to mobile recipient device 102 from location system 100 and/or website provider system 104.

Figure 19:
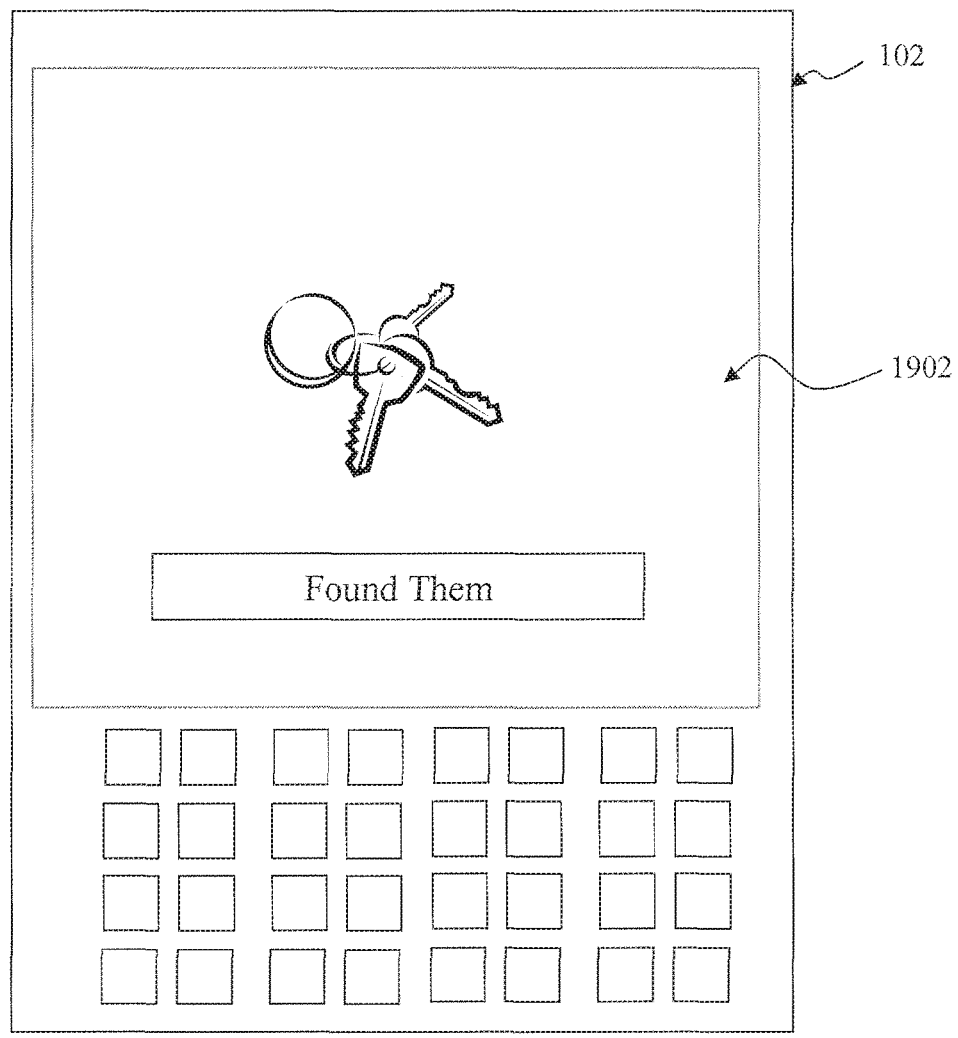
Figure 20:
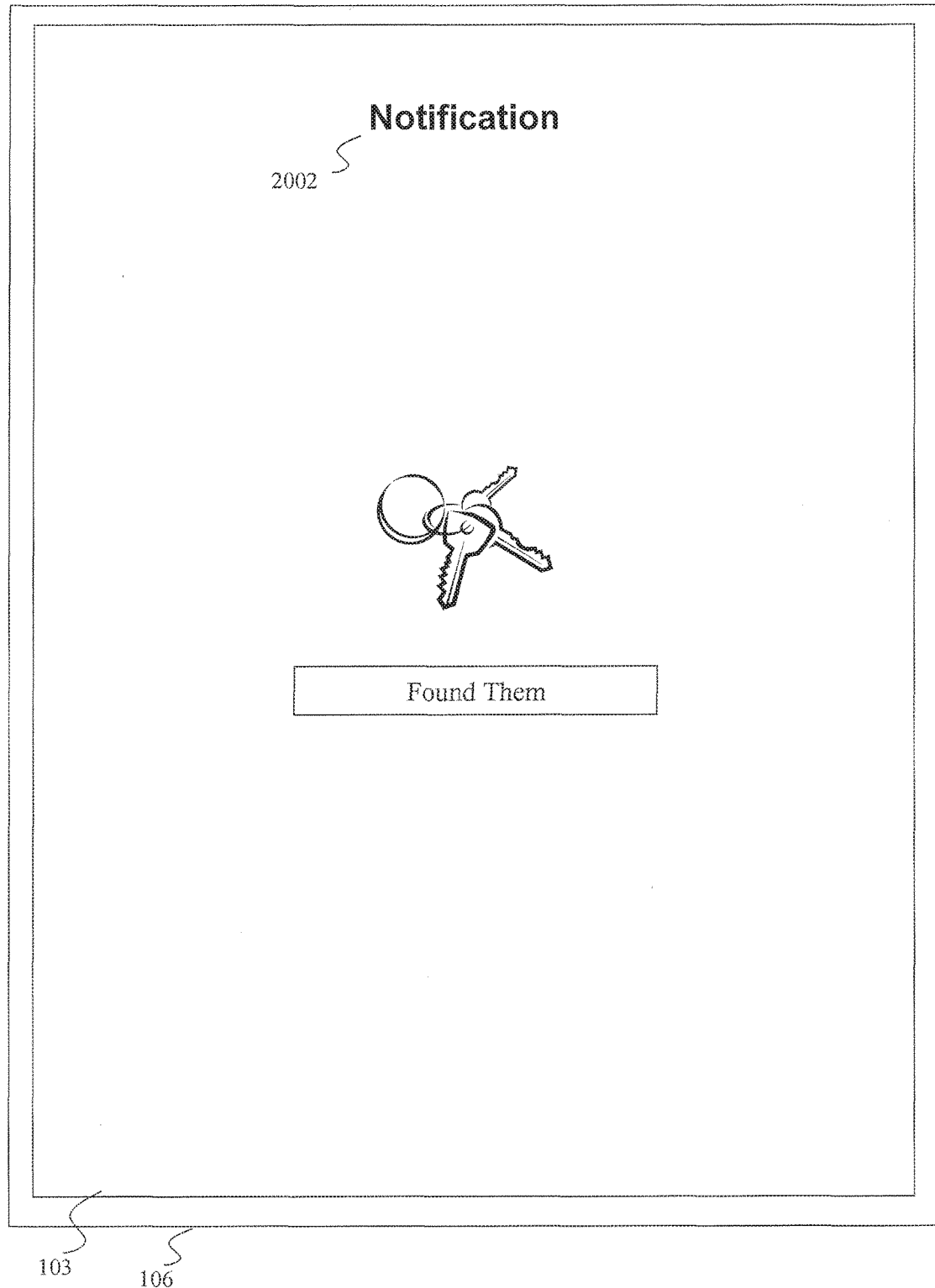

Still following the above example, referring to FIG. 19, the user of mobile recipient device 102 can communicate an additional a spot comment 1902 to the original creator of the previous a spot comment by communicating information from mobile recipient device 102 and, referring to FIG. 20, the original creator of the spot comments can receive a notification 2002.

Figure 21:
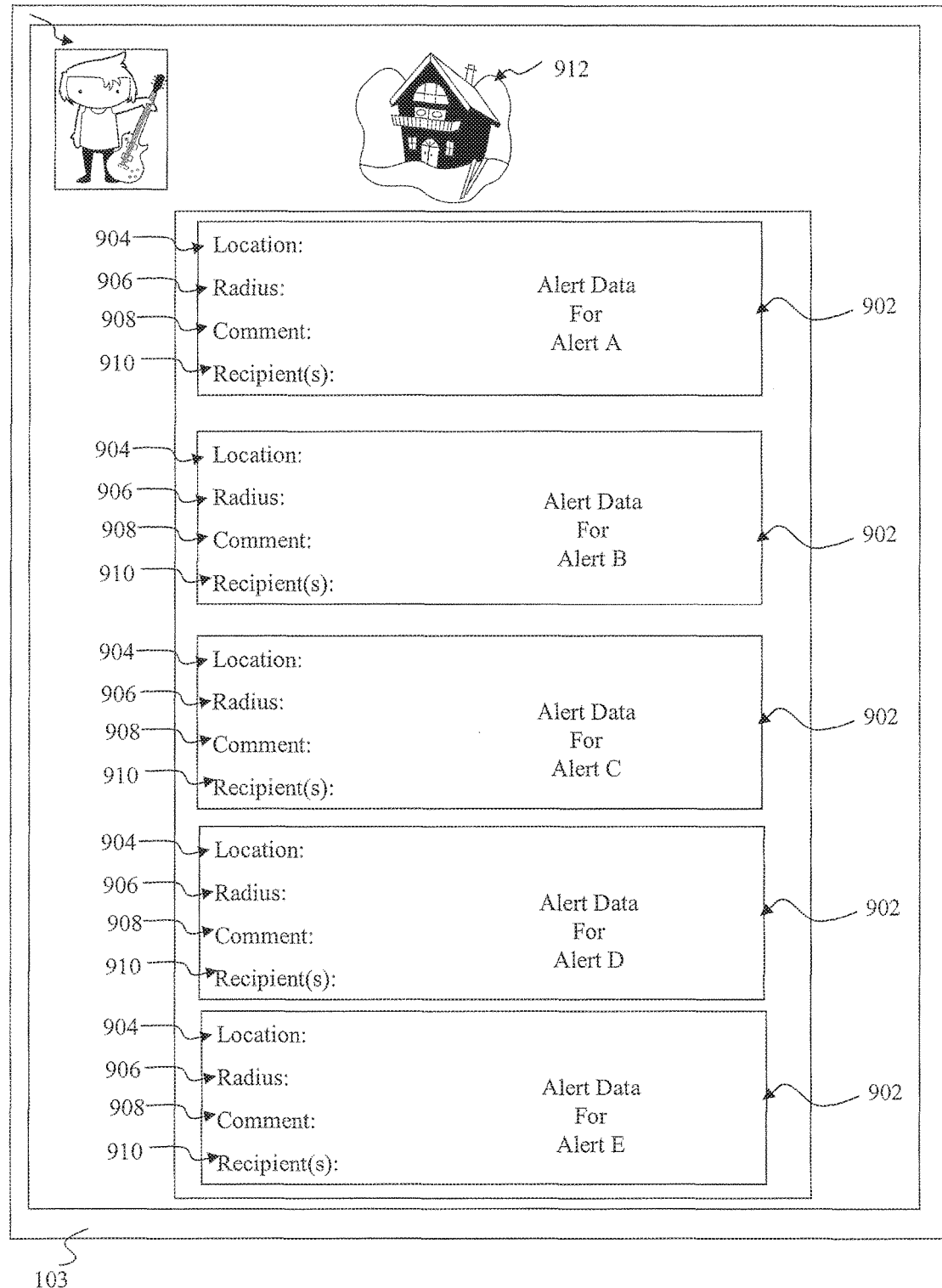
FIG. 21 illustratively depicts the aggregated exchange of information, spot alerts, and/or spot comments, in accordance with exemplary embodiments of the present invention.

Referring to FIG. 21, in exemplary embodiments, the exchange of additional spot comments can be aggregated and/or any of the spot alert data information and/or any of the recipient mobile electronic device information associated with the exchange of spot comments can be aggregated. Further, the aggregated exchange of spot comments and/or information associated with the aggregated exchange of spot comments can be displayed on and/or accessed by location system 100, mobile recipient device 102, website provider system 104, and/or user electronic device 106. For example, the aggregated exchange of spot comments and/or information associated with the aggregated exchange of spot comments can be can be accessed on a website, such as, a social networking interface and/or website that can include automatically populated information, for example, using user electronic devices and/or using recipient mobile electronic devices.

In exemplary embodiments, using user electronic devices and/or using recipient mobile electronic devices the user and/or recipient can restrict the transmission of aggregated spot comments and/or information associated with the aggregated exchange of spot comments based on variables, such as, but not limited to, various locations, distances and/or radii from that location, the content of the information, spot alert data information, and recipient mobile electronic device information to name a few. And, in exemplary embodiments, using user electronic devices and/or using recipient mobile electronic devices the user and/or recipient can restrict the transmission of aggregated spot comments and/or information associated with the aggregated exchange of spot comments to specific recipients, groups of recipients, and/or tiers of recipients, to name a few.

In exemplary embodiments, reports can be generated and/or displayed on the graphical user interface of user electronic device 106 and/or mobile recipient device 102. Further, reports can include, but are not limited to, information regarding the transmission of and/or receipt of one or more respective spot comment information sent and/or received to recipient mobile electronic devices; information regarding the transmission of and/or receipt of one or more respective spot comment information sent and/or received to recipient mobile electronic devices during a period of time; recipient mobile electronic device information; respective spot approved recipient information; recipient mobile electronic device location information; respective spot location information; respective spot range information; spot comments, respective spot comment information; physiographic data; user click through information, user and/or recipient perspective and/or impression information; demographics; recipient mobile electronic device location check in and/or arrival information for any respective location and/or respective range; time within respective locations and/or respective ranges; interaction with others users and/or recipients; information regarding altering system setting within locations; aggregated spot comments and/or information associated with the aggregated exchange of spot comments; any combination and/or separation thereof; and/or any other form of information.

In exemplary embodiments, any of location system 100, mobile recipient device 102, website provider system 104, and/or user electronic device 106 can collects and/or manage reports and provide user interaction in real time, for example, in notifications and/or reports.

It will be understood that any of the steps described can be rearranged, separated, and/or combined without deviated from the scope of the invention. For ease, steps are, at times, presented sequentially. This is merely for ease and is in no way meant to be a limitation.

Further, any number of locations can include spot comments. For ease, at times, only a few locations are described. This is merely for ease and is in no way meant to be a limitation.

It will be understood that any of the disclosed techniques can be accomplished by users associated with user electronic devices and/or mobile recipient device 102, accessing a social networking interface and/or website using, for example, utilizing processor readable instructions stored in processor readable memory that can be accessed and/or processed by a processor.

In exemplary embodiments, a set of application programming interfaces (API) from a social networking interface and/or website that can be stored in processor readable memory that can be accessed and/or processed by a processor such that members of that social networking interface and/or website can, utilizing user electronic devices and/or recipient mobile electronic devices, log in to the social networking interface and/or website, accomplish any of the disclosed techniques, and/or create, edit, modify any information such as, but not limited to, spot comments, approved recipients, respective spot approved recipient information, respective spot location information, respective spot range information, respective spot comment information, restrict the transmission of aggregated spot comments and/or information associated with the aggregated exchange of spot comments, location information, distances and/or ranges from that location, content of the information, spot alert data information, recipient mobile electronic device information, and/or any other information.

In exemplary embodiments, the systems and methods can include, for example, an algorithm that can adjust the size of a "geo-fence" based on the quantity of the people—general population density statistics; mobile electronic device users inside the geo-fence; and mobile electronic device users with the platform and/or app inside the geo-fence, to name a few. It will be understood that this can be used so that the systems and methods can be used in small locations (e.g., in New York City) and large locations (e.g., in Kansas) such that each can have same number of users inside the spots.

Now that exemplary embodiments of the present disclosure have been shown and described in detail, various modifications and improvements thereon will become readily apparent to those skilled in the art.

What is claimed is:

1. A mobile electronic device comprising:
   one or more processor readable memory;
   one or more processors operatively connected to the one or more processor readable memory; and
   one or more communications portals operatively connected to the one or more processors;
   the one or more processor readable memory having instructions stored thereon which, when executed by the one or more processors, cause the one or more processors to perform a method comprising:

determining, using the one or more processors, a location of the mobile electronic device, wherein a user of the mobile electronic device is within a network of users;

receiving, by the one or more communications portals, spot alert data associated with one or more spot alerts, the spot alert data comprising geographical range information associated with each of the one or more spot alerts, the spot alert data being configured by one or more other users within the network of users;

determining, using the one or more processors, based on the geographical range information, whether the location of the mobile electronic device is within at least one geographical range associated with at least one of the spot alerts;

determining, using the one or more processors, whether the user of the mobile electronic device is within a restricted group of users within the network of users;

upon a condition that the location of the mobile electronic device is within the at least one geographical range associated with at least one of the spot alerts and the user of the mobile electronic device is within the restricted group of users, receiving, using the one or more communications portals, the at least one spot alert;

executing, using the one or more processors, the at least one spot alert at the mobile electronic device;

generating, using the one or more processors, a comment related to the at least one spot alert based on data input to the mobile electronic device; and sending, using the one or more processors, the generated comment to a mobile electronic device associated with the one or more other users within the network of users.

2. The mobile electronic device of claim 1, further comprising at least one of one or more speakers, one or more vibrators or one or more graphical user interfaces.

3. The mobile electronic device of claim 2, wherein the at least one spot alert comprises an audio file, and the at least one spot alert is executed by the one or more speakers.

4. The mobile electronic device of claim 2, wherein the at least one spot alert comprises a vibration, and the at least one spot alert is executed by the one or more vibrators.

5. The mobile electronic device of claim 2, wherein the at least one spot alert comprises a text file, and the at least one spot alert is executed by the one or more graphical user interfaces.

6. The mobile electronic device of claim 2, wherein the at least one spot alert comprises an image file, and the at least one spot alert is executed by the one or more graphical user interfaces.

7. The mobile electronic device of claim 2, wherein the at least one spot alert comprises a video file, and the at least one spot alert is executed by the one or more graphical user interfaces.

8. The mobile electronic device of claim 1, wherein the one or more communications portals comprise at least one of a cellular antennae communications portal, a WiFi™ communications portal, a Bluetooth® communications portal or a location communications portal.

9. The mobile electronic device of claim 1, wherein the step of determining a location of the mobile electronic device is performed by at least one of (i) Global Positions Systems (GPS); (ii) GPS accessed using Bluetooth®; (iii) WiFi™ server location data; (iv) Bluetooth® based location data; (v) network based triangulation; (vi) WiFi™ server information based triangulation; (vii) Bluetooth® server information based triangulation; (viii) Cell Identification based triangulation, (ix) Enhanced Cell Identification based triangulation; (x) Uplink-Time difference of arrival based triangulation; (xi) Time of arrival based triangulation; or (xii) Angle of arrival based triangulation.

10. The mobile electronic device of claim 1, further comprising the step of sending, using the one or more communications portals, a notification to at least one other user electronic device that the at least one spot alert was received by the mobile electronic device.

11. The mobile electronic device of claim 1, further comprising the step of sending, using the one or more communications portals, a report to at least one other user electronic device comprising information regarding receipt of the at least one spot alert by the mobile electronic device during a period of time.

12. The mobile electronic device of claim 11, wherein the report further comprises at least one of mobile electronic device information, spot approved recipient information, mobile electronic device location information, spot location information, spot range information, at least one spot comment, and spot comment information.

13. The mobile electronic device of claim 11, wherein the report further comprises at least some information associated with at least one of a physiographic data; at least one of the perspective and impression of at least one of the user for any location; demographics; mobile electronic device location arrival information for any respective location; mobile electronic device location arrival information for any respective range; time within respective locations; mobile electronic device time information within respective ranges; interaction with others user; and information regarding the altering of system settings within locations.

14. The mobile electronic device of claim 1, wherein the spot alert is an advertisement.

15. The mobile electronic device of claim 1, wherein the network is a social network.

16. The mobile electronic device of claim 1, wherein the spot alert is a coupon.

17. The mobile electronic device of claim 1, wherein the spot alert is a price discount.

18. The mobile electronic device of claim 1, wherein the spot alert is an award.

19. The mobile electronic device of claim 1, wherein the spot alert data further comprises for each respective spot alert at least the following information: respective spot location information, respective spot comment information, and respective spot approved recipient information.

20. The mobile electronic device of claim 19, further comprising the step of receiving, using the one or more communications portals, modified spot alert data that comprises at least one of (i) respective spot location information, (ii) respective spot range information, (iii) respective spot comment information, and (iv) respective spot approved recipient information.

21. The mobile electronic device of claim 20, wherein the modified spot alert data is received in response to the comment.

22. The mobile electronic device of claim 20, wherein the modified spot alert data at least one of creates, edits, and restricts the spot alert data based on the respective spot approved recipient information.

23. The mobile electronic device of claim 19, wherein the respective spot approved recipient information comprises at least one of a single recipient, a plurality of recipients, a tiered level of recipients, and a nodal relationship of recipients.

24. The mobile electronic device of claim 1, wherein the spot alert data comprises at least one of monophonic, polyphonic, sounds and voice-overs, and audio-visual file format.

25. The mobile electronic device of claim 1, wherein the spot alert data comprises a video codec file format used to encode video data, and a video codec file format used to compress video data.

26. The mobile electronic device of claim 1, further comprising the step of: periodically identifying, using the one or more processors, the location of the mobile electronic device during a particular period of time.

27. The mobile electronic device of claim 1, further comprising the step of receiving, using the one or more processors, image data to be associated with the spot alert.

28. The mobile electronic device of claim 1, further comprising the step of receiving, using the one or more processors, audio data to be associated with the spot alert.

29. The mobile electronic device of claim 1, further comprising the step of receiving, using the one or more processors, new spot alert data associated with one or more new spot alerts, the new spot alert data comprising geographical range information associated with each of the one or more new spot alerts that is the same as the geographical range information associated with each of the one or more spot alerts.

30. The mobile electronic device of claim 1, further comprising the step of receiving, using the one or more processors, video data to be associated with the spot alert.

* * * * *